US007193629B2

United States Patent
Kake et al.

(10) Patent No.: US 7,193,629 B2
(45) Date of Patent: Mar. 20, 2007

(54) DISPLAY APPARATUS

(75) Inventors: Tomokazu Kake, Tokyo (JP); Akio Ohba, Tokyo (JP)

(73) Assignee: Sony Computer Entertainment Inc. (JP)

( * ) Notice: Subject to any disclaimer, the term of this patent is extended or adjusted under 35 U.S.C. 154(b) by 120 days.

(21) Appl. No.: 10/451,281

(22) PCT Filed: May 17, 2002

(86) PCT No.: PCT/JP02/04822

§ 371 (c)(1),
(2), (4) Date: Nov. 10, 2003

(87) PCT Pub. No.: WO02/095684

PCT Pub. Date: Nov. 28, 2002

(65) Prior Publication Data

US 2004/0085356 A1 May 6, 2004

(30) Foreign Application Priority Data

May 18, 2001 (JP) .............................. 2001-150013
May 17, 2002 (JP) .............................. 2002-143637

(51) Int. Cl.
*G09G 5/00* (2006.01)
*G06F 19/00* (2006.01)

(52) U.S. Cl. ...................... 345/581; 463/33; 345/636; 345/473; 345/629

(58) Field of Classification Search ............... 345/636, 345/672, 629, 473; 463/30, 31, 32, 33
See application file for complete search history.

(56) References Cited

U.S. PATENT DOCUMENTS

| 5,801,680 A | * | 9/1998 | Minakuchi ................. 345/589 |
| 5,995,111 A | | 11/1999 | Morioka et al. |
| 6,426,755 B1 | * | 7/2002 | Deering ..................... 345/581 |
| 6,628,264 B1 | * | 9/2003 | Kobayashi et al. ......... 345/156 |
| 2001/0008841 A1 | * | 7/2001 | Komata ....................... 463/6 |
| 2002/0027555 A1 | | 3/2002 | Mori |

FOREIGN PATENT DOCUMENTS

| JP | 8-286603 A1 | 11/1996 |
| JP | 10-222694 A1 | 8/1998 |
| JP | 11-161814 A1 | 6/1999 |
| JP | 2000-20754 A1 | 1/2000 |
| JP | 2000-089991 | 3/2000 |
| JP | 2000-293298 A1 | 10/2000 |
| JP | 2002-15335 A1 | 1/2002 |

* cited by examiner

*Primary Examiner*—Kee M. Tung
*Assistant Examiner*—Michelle K. Lay
(74) *Attorney, Agent, or Firm*—Lerner, David, Littenberg, Krumholz & Mentlik, LLP

(57) ABSTRACT

A communication line is connected between a client terminal apparatus 2 and a game server apparatus 3 via a network 1, and an Internet game system, which runs a pre-determined network game in a virtual space provided by the game server apparatus 3, adds blurring to objects other than the object of attention when a view point is moved in the virtual space. Accordingly, since the object of attention is clearly displayed with regard to other objects, it is possible to make the object of attention stand out even when view point moving is performed.

10 Claims, 22 Drawing Sheets

POINT OF ATTENTION

FIG. 17

| ID | ATTRIBUTE | EFFECT AMOUNT | VARIABLE RANGE |
|---|---|---|---|
| 1 | FIRST BUILDING | 8 | 0~10 |
| 2 | SECOND BUILDING | 7 | 5~10 |
| 3 | FIRST SIGN | 3 | 0~5 |
| 4 | SECOND SIGN | 0 | DISAPPROVED |
| 5 | TREE | 8 | 0~8 |
| 6 | CAR | 10 | 0~10 |
| 7 | TELEPHONE POLE | 10 | 0~10 |
| n | PERSON | 10 | 5~10 |

FIG. 18

| ATTRIBUTE | EFFECT AMOUNT |
|---|---|
| BUILDING | 7 |
| SIGN | 0 |
| TREE | 8 |
| CAR | 10 |
| TELEPHONE POLE | 10 |
| PERSON | 10 |

DISPLAY APPARATUS

TECHNICAL FIELD

Field of the Invention

The present invention is related to a display apparatus and an image processing method, which are preferable and applicable to an Internet game system and the like that runs video games in virtual space provided by a predetermined network server or a Web browser for viewing Web pages.

BACKGROUND ART

Presently, client terminal apparatus such as video game units and personal computers have widely become popularized in ordinary households; accordingly video games and viewing of Web pages on the Internet utilizing this client terminal apparatus have become frequent.

Here, in the case of moving the displayed section of the Web page displayed by such client terminal apparatus, the user performs the moving operation of the displayed section by operating an input device such as a mouse or keyboard connected to the client terminal apparatus.

Specifically, on a web page, in the case where there are displayed entities such as text and images that cannot be fully displayed within the display region of a monitor device, a scroll bar for vertical movement (and horizontal movement) is displayed in the display region.

The user drags the scroll bar in a vertical or horizontal direction, which corresponds to the scrolling direction of the display screen, with a cursor by operating the mouse device, or out of the up, down, left and right keys on the keyboard, depresses a key that corresponds to the scrolling direction of the display screen. The client terminal apparatus displays the screen while scrolling it in compliance with this depressed key. Accordingly, the displayed entities such as text and/or images that were not fully displayable in the display region of the monitor device may be displayed therein.

On the other hand, in a video game, in the case of moving a virtual character in a three-dimensional space from one location to another displayed on a monitor device, for example, the user depresses the key corresponding to the character's moving direction out of the up, down, left and right keys provided on the controller, which is connected to the client terminal apparatus, or manipulates a stick-like analog controller, which is provided on the controller, at an inclination in the character's moving direction. Accordingly, the video game character moves within the virtual three-dimensional space by corresponding to the depression of the up, down, left and right keys or the inclined manipulation of the analog controller.

Here, there are cases where displayed entities such as precautions and advertisements for the user to be expected to perceive exist in the virtual three-dimensional space of the video game or Web page. However, conventionally, when scrolling a Web page, there were problems such that the displayed entities such as precautions and advertisements for the user to be expected to perceive could no longer impress the user due to blurring generating on the text and images in accordance with the scrolling speed.

In addition, similarly with video games, when performing a character moving operation, there are problems such that the displayed entities such as a sponsor's advertisement can no longer impress the user due to blurring generating on the images of characters and background.

The present invention has come about in consideration of such issues, and the objective thereof is to provide a display apparatus and an image processing method, which allow displaying such that displayed entities to impress a user such as precautions and advertisements stand out, even in the case where displayed entities such as text and images are displayed while moving.

DISCLOSURE OF THE INVENTION

The present invention configures a display screen with objects, which have a predetermined image effect added thereto, and objects, which do not have a predetermined image effect, such that the user can hold a sense of incompatibility with respect to an object as an attention within the display screen.

Accordingly, the object as the attention, which is a displayed entity to impress the user, such as precautions and advertisements, can catch the user's attention, so that the object as the attention can stand out.

BRIEF DESCRIPTION OF DRAWINGS

FIG. 17 is a diagram for explaining a parameter table of the network system according to the eight embodiment of the present invention.

FIG. 18 is a diagram for explaining a modified example of the parameter table of the network system according to the eighth embodiment.

BEST MODE FOR CARRYING OUT THE INVENTION

FIRST EMBODIMENT

System Configuration

Figure 1:
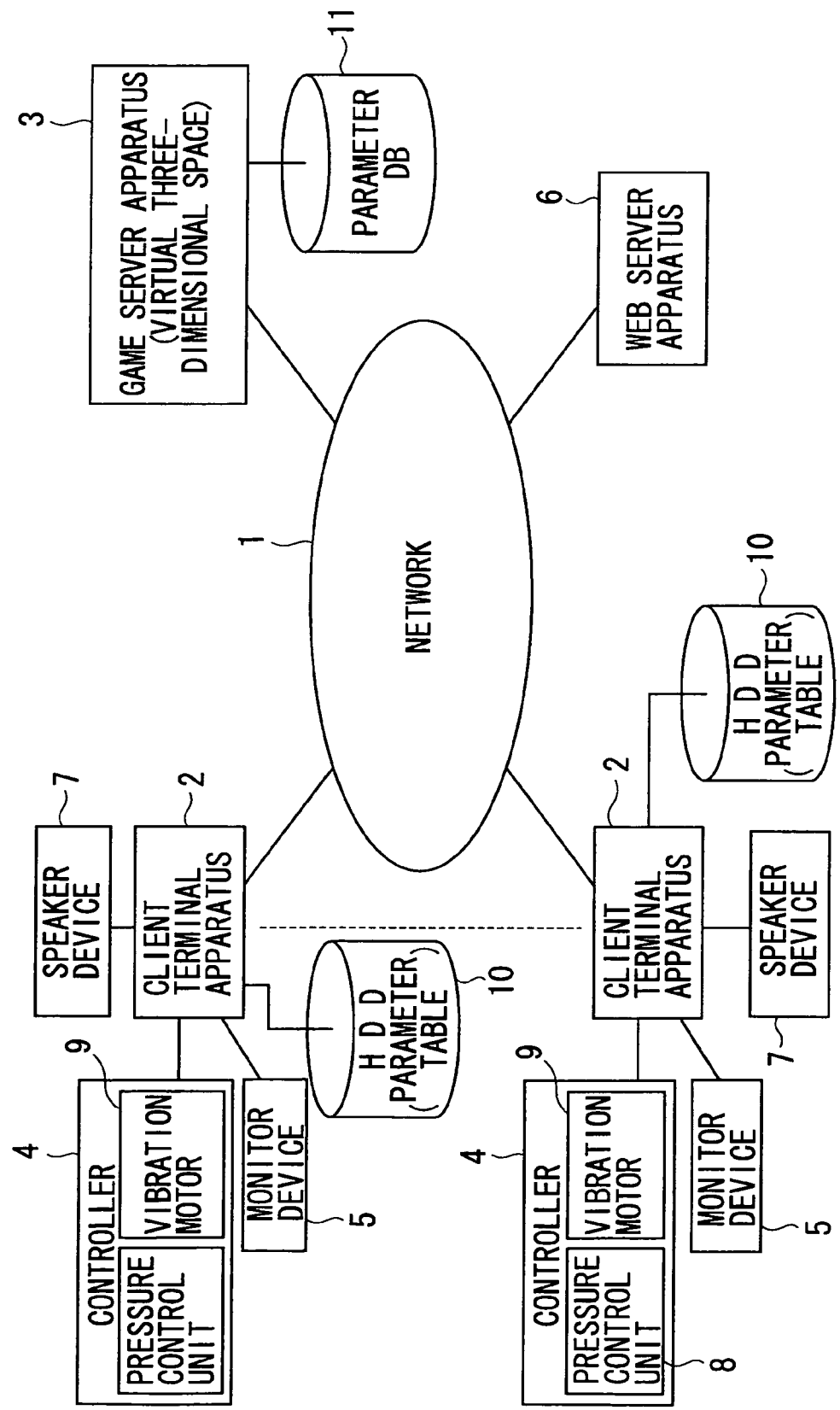
FIG. 1 is a block diagram of an Internet game system according to the first embodiment of the present invention.

To begin with, a block diagram of an Internet game system according to the first embodiment of the present invention is shown in FIG. 1. As can be understood from FIG. 1, the Internet game system of this embodiment has a plurality of client terminal apparatus 2, which respectively linked to a predetermined network 1 such as the Internet, and a game server apparatus 3, which provides virtual three-dimensional space to the respective users having a client terminal apparatus 2.

A controller 4, monitor device 5, speaker device 7, and secondary storage medium drive such as a hard disc drive 10 (HDD) are connected to each client terminal apparatus 2, respectively.

Figure 2:
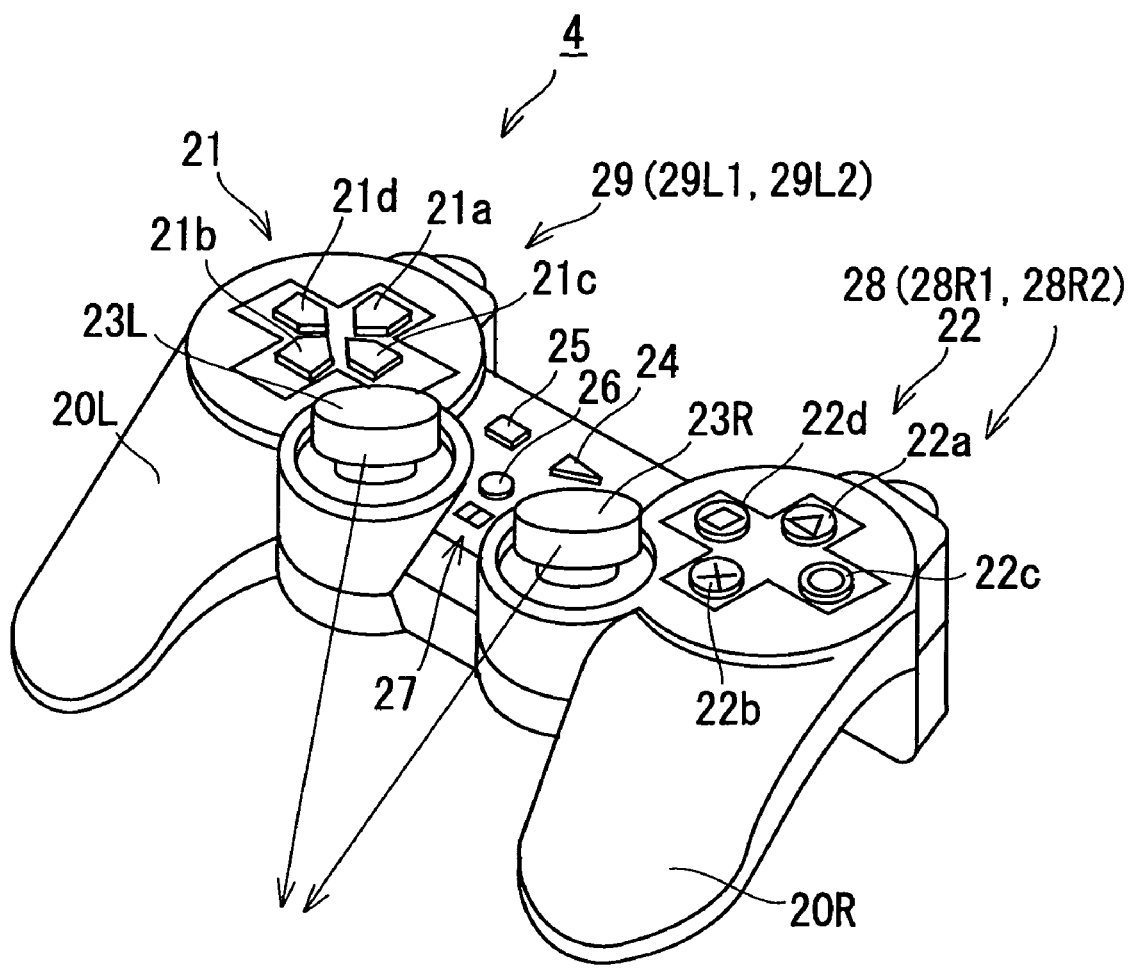
FIG. 2 is a perspective view showing the exterior of a controller, which is provided to the client terminal apparatus of the Internet game system of the first embodiment.
Figure 2:
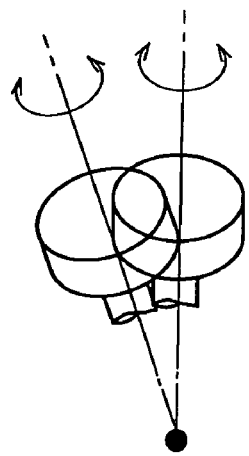

Among these, the controller 4 has two grips 20R, 20L as shown in FIG. 2, for example, whereby a player operates this controller 4 by gripping the respective grips 20R, 20L with the right and left hands.

First and second operation parts 21, 22 and analog controllers 23R, 23L are respectively provided on this controller 4, in the position such that manipulation by each thumb, for example, is possible when in the state where each grip 20R, 20L is gripped with the right and left hands.

The first operation part 21 is provided with command buttons for carrying out commands such as for in the direction that a character proceeds or the direction of the point of view, for example, and an up direction button 21a for commanding an upward direction, a down direction button 21b for commanding a downward direction, a right direction button 21c for commanding a rightward direction, and a left direction button 21d for commanding a leftward direction are respectively provided thereon.

A Δ button 22a, which is provided with a Δ shaped stamp, a X button 22b, which is provided with a X shaped stamp, a ○ button 22c, which is provided with a ○ shaped stamp, and a □ button 22d, which is provided with a □ shaped stamp, are respectively provided on the second operation part 22.

The analog controllers 23R, 23L are held in an upright state (non-diagonal state=standard position) during non-inclined operations so as to maintain that position. When either the analog controller 23R or analog controller 23L is manipulated at an inclination, the controller 4 supplies to the client terminal apparatus 2 the coordinate values of the XY coordinates according to the amounts of slant and direction relative to the standard position as operation outputs.

Furthermore, this controller 4 has a start button 24 for carrying out such commands as game execution start; a select button 25 for carrying out the selection of predetermined items and the like; and a mode selection switch 26 for selecting either analog mode or digital mode.

In the case where the analog mode is selected by this mode selection switch 26, a light emitting diode (LED) 27 is controlled to turn ON, resulting in the analog controllers 23R, 23L to be in an operating state; in the case where the digital mode is selected, the light emitting diode 27 is controlled to turn OFF, resulting in the analog controllers 23R, 23L to be in a non-operating state.

Furthermore, a right button 28 and left button 29 are provided on this controller 4, in the position such that manipulation by the index finger (or middle finger) of each hand, for example, is possible in the state where each grip 20R, 20L is gripped with the right and left hands. Each of these buttons 28, 29 has first and second right buttons 28R1, 28R2 and first and second left buttons 29L1, 29L2, which are respectively provided linearly along the thickness (=along the height) of the controller 4.

The player, by manipulating the respective buttons, may manipulate characters or change the view point in the virtual three-dimensional space, which is provided by the game server apparatus 3.

Furthermore, on the controller 4 are provided a pressure control unit 8, which variably controls the pressure applied on the above-mentioned buttons 22a to 22d, and a vibration motor 9, which is for vibrating this controller 4 itself. These pressure control unit 8 and vibration motor 9 are controlled in accordance with the distance, angle and the like between the view point and the object of attention such as a sign, whereby the presence of the sign and such are tactilely made known to the user, which will be described later. Furthermore, the speaker device 7 controls a predetermined output of sound in accordance with the distance, angle and the like between the view point and the object of attention such as a sign, whereby the presence of the sign and the like are auditorily made known to the user.

System Operations

The Internet game system, according to this embodiment, is of an enjoyable Internet video game, which performs the modifying operation of the view point in a virtual town (three-dimensional space) provided by the game server apparatus 3, allowing a walk through the town within this three-dimensional space or manipulation of a character created by the user to move within this three-dimensional space so as to shop at stores and the like communicating with another user's character and the like.

Figure 3:
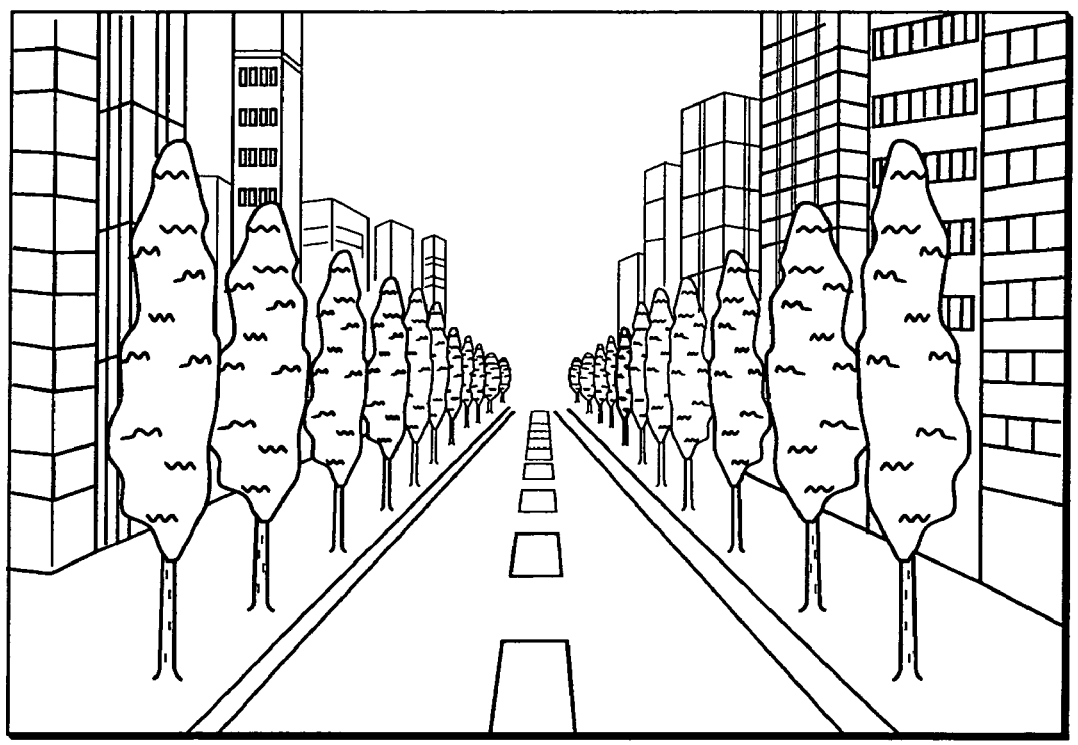
FIG. 3 is a diagram showing an example of virtual three-dimensional space, which is provided by the game server apparatus of the Internet game system of the first embodiment.

In the case of executing this Internet video game, the user activates the Web browser of the client terminal apparatus 2 and then links his/her own client terminal apparatus 2 to the game server apparatus 3 via this Web browser. The game server apparatus 3 sends predetermined image information of a virtual three-dimensional space to the client terminal apparatus 2 once a communication line is connected therebetween. Accordingly, a virtual three-dimensional image of a street of buildings, for example, as shown in FIG. 3 is displayed on the monitor device 5 connected to that user's client terminal apparatus 2.

The user may virtually and freely move within such three-dimensional street of buildings by manipulating the respective up, down, left and right direction buttons 21*a* to 21*d* or respective analog controllers 23R, 23L of the controller 4.

Namely, when moving within such virtual three-dimensional space, the user depresses the respective up, down, left and right direction buttons 21*a* to 21*d* or manipulates at an inclination the respective analog controllers 23R, 23L of the controller 4. The information indicating the operating state of this controller 4 is sent to the game server apparatus 3 from the client terminal apparatus 2. The game server apparatus 3, when receiving the information that indicates the operating state of the controller 4, sequentially sends the image information of the three-dimensional space that corresponds to the operating state of this controller 4 back to the client terminal apparatus 2.

Accordingly, the three-dimensional space image corresponding to the user's controller manipulation is sequentially displayed on the monitor device 5, which is connected to the client terminal apparatus 2, whereby the user may virtually move within the three-dimensional space (may obtain a sense of moving within the three-dimensional space) via the three-dimensional space image displayed on this monitor device 5.

Displaying Operation of Attention Point During Moving Operation

Here, the Internet game system of this embodiment is capable of expressing the sense of movement according to the user's manipulation of the controller 4 by adding a blur to each object utilizing an image processing technique called "motion blur" and displaying the object.

However, it is desirable to clearly display an "object of attention" such as, for example, an advertisement sign of a sponsor that supports this Internet game system;

an advertisement sign of a company that paid advertising fee to the manager of this Internet game system;

a building and the like holding some kind of event;

a place where some kind of item exist; and an object whereupon precautions or messages and the like are contained, without generating blurring despite the moving operation of the controller 4.

As a result, with this Internet game system, the "object of attention" may be clearly displayed without adding any blurring by motion blur despite the moving operation of the controller 4.

Figure 4:
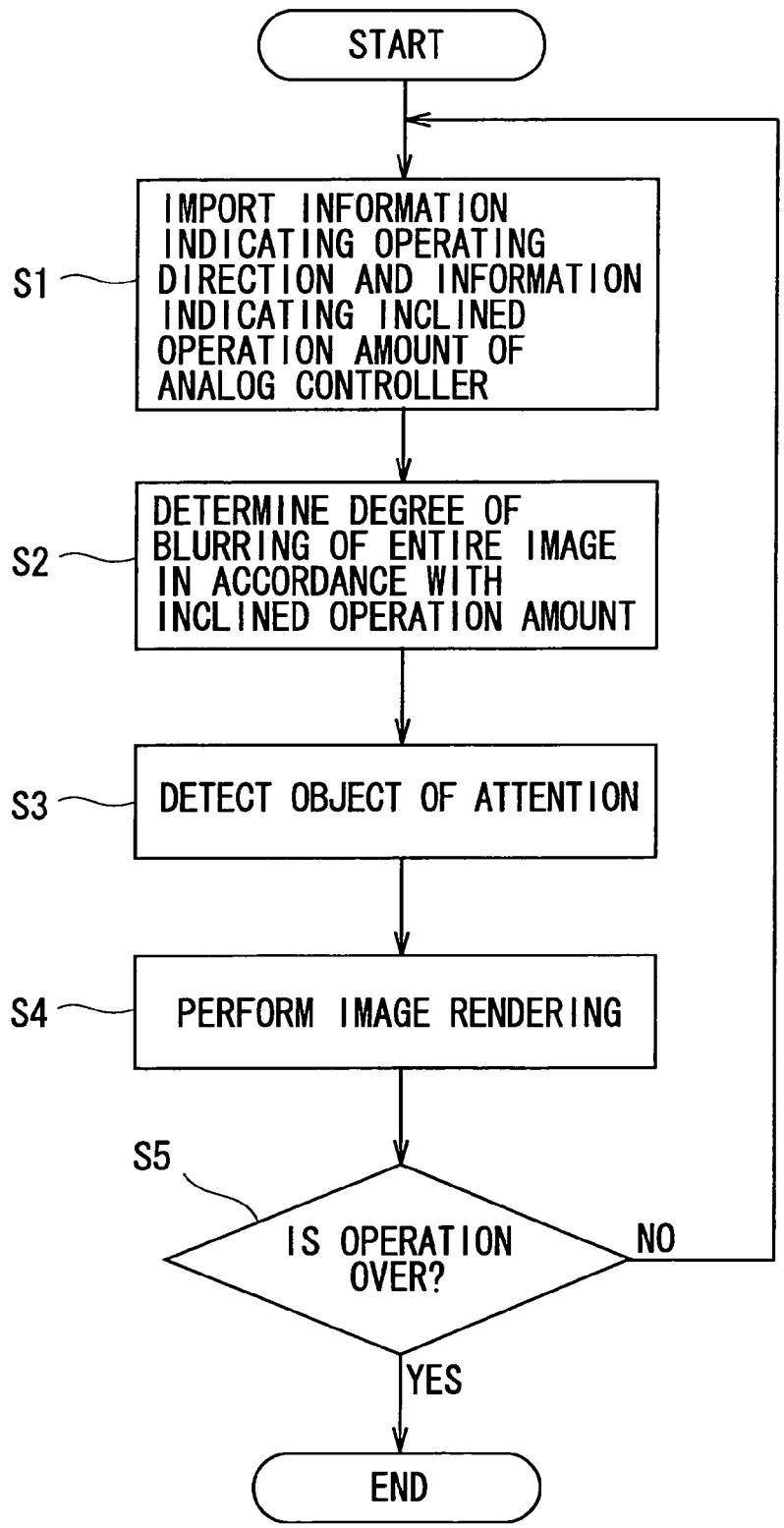
FIG. 4 is a flowchart for explaining an image rendering procedure in the case where moving operation is performed using the analog controller of a controller, which is provided to the above client terminal apparatus.
Figure 6:
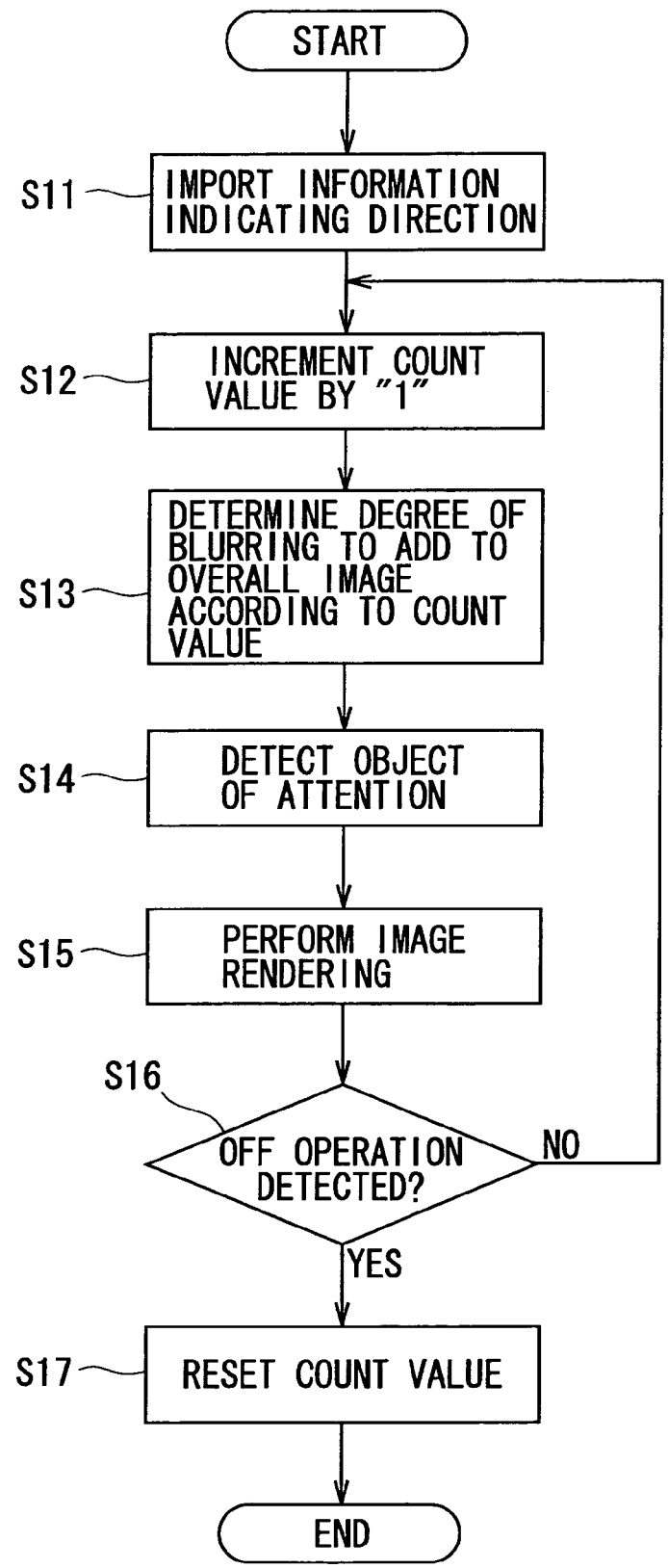
FIG. 6 is a flowchart for explaining an image rendering procedure in the case where moving operation is performed using the direction buttons of the controller, which is provided to the above client terminal apparatus.

The steps of the image rendering procedure in the case of the user performing the moving operation using the analog controllers 23R, 23L of the controller 4; and in addition, the steps of the image rendering procedure in the case of the user performing the moving operation using the respective up, down, left and right direction buttons 21*a* to 21*d* are respectively shown in the flowcharts in FIG. 4 and FIG. 6.

(Image Rendering in Accordance with Inclined Manipulation of Analog Controller)

To begin with, the image rendering procedure in the case of manipulating the analog controllers 23R, 23L at an inclination will be described using the flowchart in FIG. 4.

This image rendering procedure shown in this flowchart in FIG. 4 starts at the timing of when the client terminal apparatus 2 detects manipulation of the analog controller 23R or analog controller 23L at an inclination by the user, proceeding to step S1.

The client terminal apparatus 2 sends the respective detected information, which indicates the manipulating direction and the amount of inclined operation of the analog controller 23R or analog controller 23L, to the game server apparatus 3 side.

In step S1, the game server apparatus 3 imports the respective information indicating the manipulating direction and the amount of inclined operation of the analog controller 23R or analog controller 23L that are sent from this client terminal apparatus 2. Accordingly, this image rendering procedure proceeds to step S2.

Next, the game server apparatus 3 expresses the appearance of moving in the three-dimensional space by adding blurring to each object configuring the three-dimensional image of the street of buildings, utilizing the image processing technique of "motion blur". At this time, the game server apparatus 3, in the case of importing information that indicates a little amount of the inclined operation, sets the amount of blurring for each object configuring the three-dimensional image of the street of buildings to be small, expressing the state where the user slowly moves within that three-dimensional space. Furthermore, the game server apparatus 3, in the case of importing information that indicates a large amount of the inclined operation, sets the amount of blurring for each object configuring the three-dimensional image of the street of buildings to be large, expressing the state where the user quickly moves within that three-dimensional space.

In step S2, the game server apparatus 3, based on the information indicating the above-mentioned amount of inclined operation, determines the amount of blurring for each object configuring the three-dimensional image of the street of buildings to be displayed. Accordingly, this image rendering procedure proceeds to step S3.

In step S3, the game server apparatus 3 detects the aforementioned "object of attention". Accordingly, this image rendering procedure proceeds to step S4.

Next, in step S4, the game server apparatus 3, with the object of attention that does not have blurring added thereto by motion blur, and the object that has blurring added thereto by motion blur in accordance with the user's amount of inclined operation in manipulating the analog controller 23R or analog controller 23L, performs image rendering to the three-dimensional image of the street of buildings in correspondence with the manipulating direction of the analog controller 23R or analog controller 23L, sending this resulting image information to the user's client terminal apparatus 2. Accordingly, this image rendering procedure proceeds to step S5.

The client terminal apparatus 2 controls to display the three-dimensional image, which corresponds to the image information sent from the game server apparatus 3, upon the monitor device 5. Accordingly, a three-dimensional image, which corresponds to the user's manipulating direction of the analog controller 23R or analog controller 23L, and which has blurring added overall in accordance with the amount of inclination in manipulating the analog controller 23R or analog controller 23L by the user, but has no blurring added to the object of attention, is displayed upon the monitor device 5.

Figure 5A:
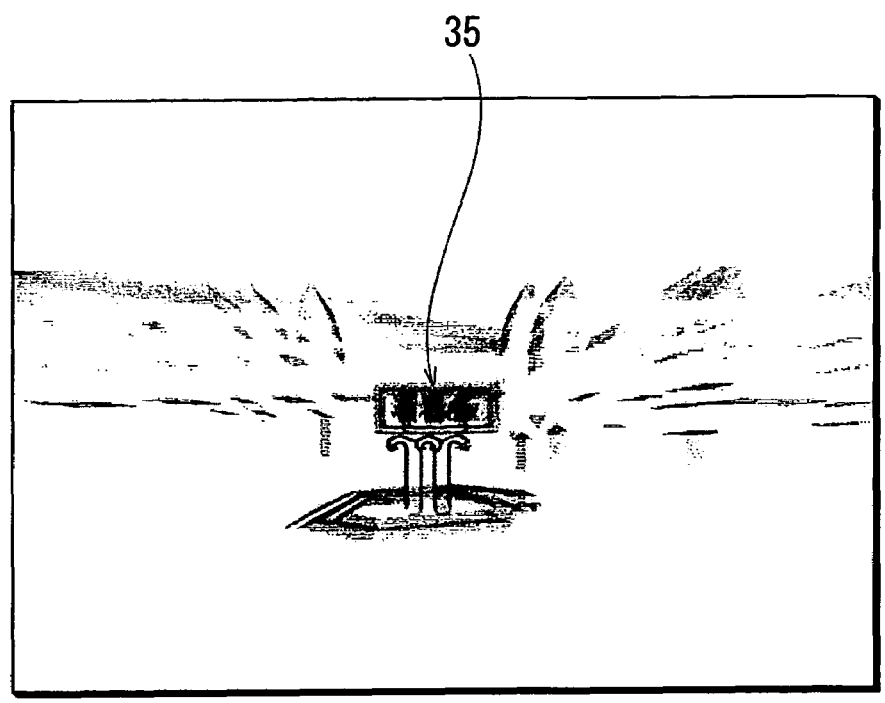
FIG. 5 are diagrams for explaining a displayed image where motion blur is added to objects other than the object of attention.
Figure 5B:
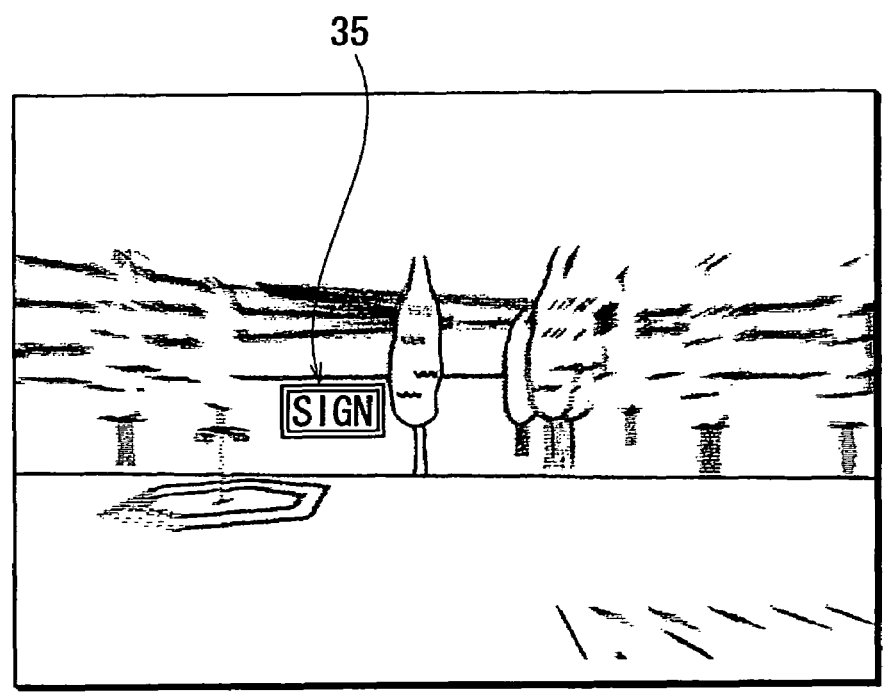

An example of a three-dimensional image where blurring is added overall by motion blur, and an example of a three-dimensional image where blurring is added overall except for on the object of attention (in the case of this example, sign 35) by motion blur, are respectively shown in FIG. 5A and FIG. 5B.

As can be understood by comparing FIG. 5A and FIG. 5B, in the case of this example, if image rendering is performed without adding blurring by motion blur to the sign 35, which is the object of attention, since blurring is added to the overall displayed image by motion blur, the sign 35, which is the object that does not have blurring added thereto, may be made to stand out.

As a result, the "object of attention" such as an advertisement sign of a sponsor that supports this Internet game system; an advertisement sign of a company that paid advertising fee to the manager of this Internet game system; a building holding some kind of event; a place where some kind of item exist; and an object whereupon precautions or messages and the like are contained, may be clearly displayed despite the moving operation of the controller 4.

Next, the client terminal apparatus 2, while the analog controller 23R or analog controller 23L is being manipulated at an inclination by the user, sends to the game server apparatus 3 the information indicating the manipulating direction and the amount of inclined manipulation of the analog controller 23R or analog controller 23L.

Note that while the analog controller 23R or analog controller 23L is not being manipulated at an inclination by the user, the client terminal apparatus 2 sends to the game server apparatus 3 the information indicating "0" amount of inclined manipulation of the analog controller 23R or analog controller 23L.

In step S5, the game server apparatus 3 determines whether or not manipulation of the analog controller 23R or analog controller 23L has ended (non-inclined manipulating state or not) by determining whether or not information indicating "0" amount of inclined manipulation sent from the client terminal apparatus 2 has been received. Then, in the case where it is determined by the game server apparatus 3 that manipulation of the analog controller 23R or analog controller 23L has ended, the entire routine of this image rendering procedure concludes.

On the other hand, in the case where it is determined that manipulation of the analog controller 23R or analog controller 23L has not ended, this image rendering procedure returns to step S1. Returning the image rendering procedure from step S5 to step S1 indicates that the analog controller 23R or analog controller 23L is continuously being manipulated by the user.

As a result, in this case, the game server apparatus 3, in step S1, imports the respective information indicating the manipulating direction and the amount of inclined manipulation of the analog controller 23R or analog controller 23L; in step S2, determines the amount of blurring to be added by motion blur to the objects other than the object of attention according to the amount of inclined manipulation of the analog controller 23R or analog controller 23L. Then, the game server apparatus 3, in step S3, detects the object of attention; in step S4, performs image rendering to the three-dimensional image, wherein the objects other than this object of attention are added with blurring to a degree in accordance with the manipulated amount of inclination of the analog controller 23R or analog controller 23L, which corresponds to the user's manipulating direction.

Note that in the case where manipulation of the analog controller 23R or analog controller 23L at an inclination is continuously detected, the amount of blurring added to the objects other than the object of attention in the above-mentioned step S2 may be gradually increased according to that period of continuous manipulation.

Accordingly, the amount of blurring for the three-dimensional image displayed upon the monitor device 5 gradually increases in accordance with the period of continuous manipulation of the analog controller 23R or analog controller 23L, whereby the sensation of quickly moving within the three-dimensional space is gradually provided to the user. Even in this case, it is possible to clearly display the object of attention without any added blurring thereto.

(Image Rendering in Accordance with Depression of Up, Down, Left or Right Direction Buttons)

Next, the image rendering procedure in the case of depressing one of the up, down, left and right direction buttons 21a to 21d will be described using the flowchart in FIG. 6.

This image rendering procedure shown in FIG. 6 starts at the timing of when the client terminal apparatus 2 detects depression of one of the up, down, left and right direction buttons 21a to 21d by the user, proceeding to step S11.

The client terminal apparatus 2 continues to send to the game server apparatus 3 the information indicating a user-depressed direction button of the up, down, left and right direction buttons 21a to 21d for the time period during the buttons being continuously depressed.

In step S11, the game server apparatus 3 imports the information sent from this client terminal apparatus 2 indicating the direction button depressed by the user. Accordingly, this image rendering procedure proceeds to step S12.

Next, the game server apparatus 3, in the case where information indicating the direction button depressed by the user is sent, may determine the amount of blurring by motion blur in accordance with the length of time this information is continuously being received. Therefore, in step S2, since the length of time the information indicating the above-mentioned direction buttons is continuously received should be counted, the count value of the counter is incremented by "1". Accordingly, this image rendering procedure proceeds to step S13.

In step S13, the game server apparatus 3, according to the count value of the above-mentioned counter, determines the amount of blurring for each object configuring a three-dimensional image of the street of buildings to be displayed. Accordingly, this image rendering procedure proceeds to step S14.

In step S14, the game server apparatus 3 detects an "object of attention" such as, for example, an object in an advertisement sign; an object whereupon precautions or messages or the like are contained; a building and the like holding some kind of event; and a place where some kind of item exist. Accordingly, this image rendering procedure proceeds to step S15.

Next, in step S15, the game server apparatus 3, with the object of attention that does not have blurring added thereto by motion blur, and the objects that have blurring added thereto by motion blur in accordance with the above-mentioned count value which indicates the length of time the user continuously depresses one of the up, down, left and right direction buttons 21a to 21d, performs image rendering to the three-dimensional image of the street of buildings, sending this image information to the user's client terminal apparatus 2.

Accordingly, blurring is added overall by motion blur in accordance with the above-mentioned count value which indicates the length of time the user continuously operates one of the up, down, left and right direction buttons 21a to 21d; however, the three-dimensional image where blurring is not added to the object of attention (see FIG. 5B) is displayed upon the user's monitor device 5, and this image rendering procedure proceeds to step S16.

Next, the client terminal apparatus 2, while one of the direction buttons 21a to 21d is being depressed by the user, sends to the game server apparatus 3 the information indicating that depressed direction button; and in the case where any one of the direction buttons 21a to 21d are not being depressed by the user, sending of information is not performed.

In step S16, the game server apparatus 3, by determining whether or not information indicating the direction button depressed by the user continues to be received from the client terminal apparatus 2, determines whether or not operation for that depressed button of the direction buttons 21a to 21d has ended (non-operating state or not). In the case where the game server apparatus 3 has determined that depression of that button of the direction buttons 21a to 21d has ended, this image rendering procedure proceeds to step S17. In this step S17, the game server apparatus 3 resets the count value of the counter for counting the continuous depressing time of the respective direction buttons 21a to 21d. Accordingly, the entire routine of this image rendering procedure is over.

On the other hand, in step S16, in the case where it is determined that depression of that direction button of the direction buttons 21a to 21d has not ended, this image rendering procedure returns to step S1, the game server apparatus 3 further increments by "1" the count value of the above-mentioned counter, and forms a three-dimensional image that is added with blurring in accordance to this incremented count value.

Accordingly, while one of the direction buttons 21a to 21d is being continuously depressed, since the count value of the above-mentioned counter gradually becomes a large value, the amount of blurring to be added to the objects other than the object of attention gradually increases, whereby a three-dimensional image with a sense of movement, which allows the user to obtain a sense of quickly moving within the three-dimensional image, may be provided.

Note that even in the case where the count value gradually becomes a large value, there is no blurring added to the object of attention. Accordingly, the object of attention may be clearly displayed.

Effect of the First Embodiment

As is clear from the above description, the Internet game system of this first embodiment adds an amount of blurring to objects other than the object of attention according to the amount of inclination in manipulation of the analog controller 23R or analog controller 23L, or according to the continuous depressing time of the depressed direction button of the up, down, left and right direction buttons 21a to 21d, and display the objects.

Accordingly, the "object of attention" such as an advertisement sign of a sponsor that supports this Internet game system; an advertisement sign of a company that paid advertising fee to the manager of this Internet game system; a building holding some kind of event; a place where some kind of item exist; and an object whereupon precautions or messages and the like are contained, may be clearly displayed despite the moving operation (above-mentioned inclined manipulation or depression) of the controller 4.

Furthermore, in the description of this embodiment, the game server apparatus 3 forms a three-dimensional image corresponding to the manipulation of the controller 4, which is connected to the client terminal apparatus 2, sending it to the client terminal apparatus 2.

However, the respective data and image rendering program for three-dimensionally rendering the object data, texture data and the like, which are for forming the three-dimensional image corresponding to the manipulation of the controller 4, may be sent to the client terminal apparatus 2, wherewith the three-dimensional image based on each of these data is formed on the client terminal apparatus 2 (=a three-dimensional image formed on the game server apparatus 3 may be sent to the client terminal apparatus 2, or each data for forming the three-dimensional image may be sent to the client terminal apparatus 2 from the game server apparatus 3, forming the three-dimensional image on the client terminal apparatus 2).

Second Embodiment

Next, an Internet game system according to the second embodiment of the present invention is described. The Internet game system, according to this second embodiment, is the one such that image rendering is performed without adding any blurring to the above object of attention by motion blur, as well as performing image rendering, which displays the object of attention to further stand out by making the magnifying and reducing speeds of this object of attention differ from the magnifying and reducing speeds of other objects.

Note that since this second embodiment and the above first embodiment only differ in this regard, description of only these differences will be made in the following, wherewith duplicate descriptions will be omitted.

In this case, as the view point is moved closer to the object of attention, the game server apparatus 3 forms image information of the image of this gradually growing object of attention, sending it to the client terminal apparatus 2. At this time, the game server apparatus 3 displays the magnification or reduction of this image of the object of attention at a differing magnifying or reducing speed from that of the other objects, without adding blurring to the object of attention by motion blur.

Figure 7A:
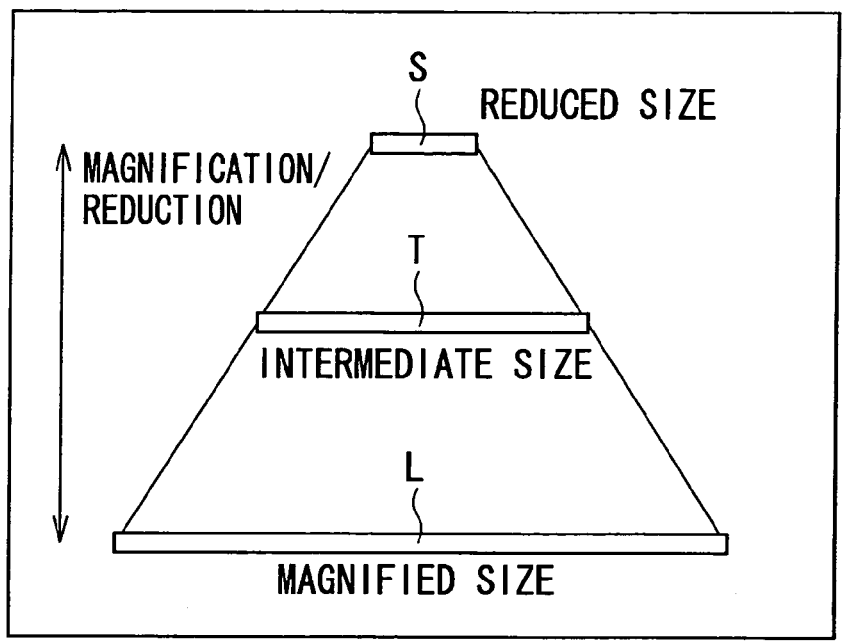
FIG. 7 are diagrams for explaining the magnified and reduced speeds of an object of attention when the magnification/reduction operation is performed.
Figure 7B:
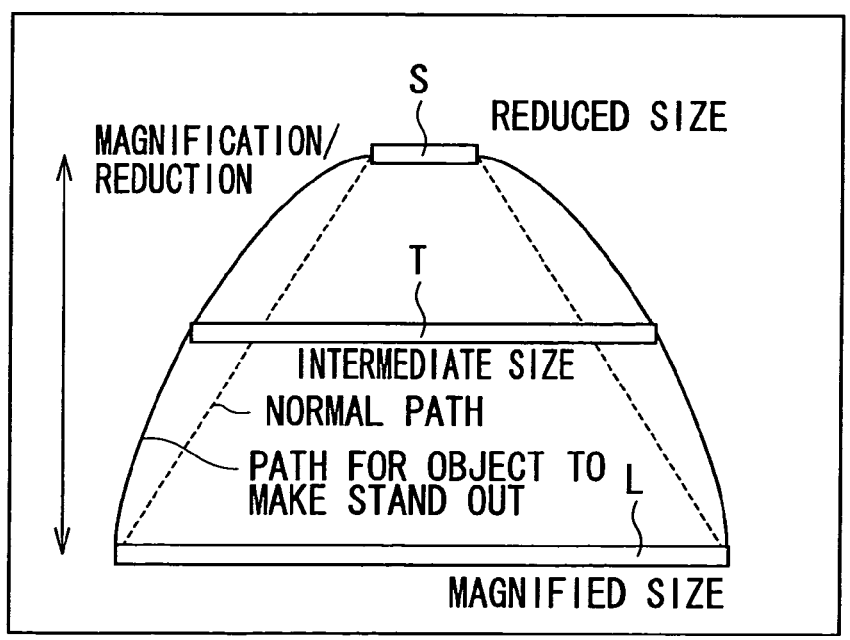

A diagram conceptually showing the magnifying and reducing speeds of an object other than the object of attention, and a diagram conceptually showing the magnifying and reducing speeds of an object of attention are respectively shown in FIG. 7A and FIG. 7B.

As can be understood by comparing FIG. 7A and FIG. 7B, the changes in magnifying and reducing speeds of the object of attention are shown as different changes from those of the object other than the object of attention.

Specifically, in the case of displaying the object other than the object of attention as gradually magnifying, the game server apparatus 3, as shown in FIG. 7A, forms the image by almost linearly changing the magnifying speed to change the object size from an original size T to a magnified size L.

Furthermore, in the case of displaying the object other than the object of attention as gradually reducing in size, the game server apparatus 3, as shown in FIG. 7A, forms the image by almost linearly changing the reducing speed to change the object size from the original size T to a reduced size S.

The dotted lines in FIG. 7B indicate the transition of magnifying or reducing speed in the case of displaying such object other than the object of attention as gradually magnifying or reducing in size. The solid lines in FIG. 7B indicate the transition of magnifying or reducing speed in the case of displaying the object of attention as gradually magnifying or reducing in size.

As can be understood from the transition of magnifying or reducing speed indicated by these dotted lines in FIG. 7B, in the case of an object other than the object of attention, the game server apparatus 3 forms the linearly magnified or reduced image of this object.

On the contrary, in the case of the object of attention, as can be understood from the transition of magnifying or reducing speed indicated by the solid lines in FIG. 7B, the game server apparatus 3, when magnifying, forms the magnified image of the object of attention more quickly than the other objects; and when reducing, forms the reduced image of the object of attention more slowly than the other objects.

Then, the game server apparatus 3 sends to the client terminal apparatus 2 the image information of the object of attention and the objects other than the object of attention, which are formed by such differing magnifying or reducing speeds.

Accordingly, the object of attention displayed upon the user's monitor device 5 is different from other objects in addition to being clearly displayed without additional blurring through motion blur, when magnifying, magnification thereof is displayed quicker than other objects, and when reducing, reduction thereof is displayed slower than other objects. As a result, the object of attention may further stand out, and similar effects as with the above Internet game system according to the first embodiment may be obtained.

Modified Example of the Second Embodiment

In the description of this second embodiment, the object of attention has been made to further stand out by using image rendering techniques, which do not add blurring to the object of attention by motion blur, in combination with image rendering techniques, whereby the magnifying or reducing speed of the object of attention differs from that of other objects; however, here, the object of attention may be made to stand out by utilizing just the image rendering techniques whereby the magnifying or reducing speed of the object of attention differs from that of other objects.

Even this case, since the magnification or reduction of the object of attention is displayed at a differing magnifying or reducing speed from that of the other objects, which gives the user looking at the screen a kind of sense of incompatibility, thus making the object of attention stand out.

Third Embodiment

Next, an Internet game system, according to the third embodiment of the present invention, is described. The Internet game system, according to the above first and second embodiments, is the one that, by forming an object that has blurring added by motion blur and an object without blurring during the moving operation, makes the object that is not added with blurring stand out as the object of attention.

The Internet game system, according to this third embodiment, forms a general three-dimensional image based on the depth of field, and among the respective objects forming this three-dimensional image, makes the object of attention stand out by focusing the object of attention despite the depth of field.

Note that since this third embodiment and each of the above embodiments only differ in this regard, description of only these differences will be made in the following, wherewith duplicate descriptions will be omitted.

Namely, in the case of the Internet game system of this third embodiment, the game server apparatus 3 forms a three-dimensional image corresponding to the user's view point with an object of attention which is formed without adding depth of field, and other objects formed with depth of field, then sends the image to the user's client terminal apparatus 2.

Figure 8A:
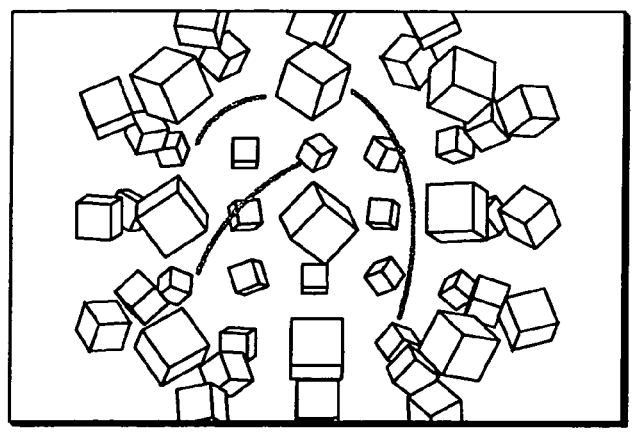
FIG. 8 are diagrams showing examples in which objects of attention are displayed so as to stand out by varying depth of field.
Figure 8B:
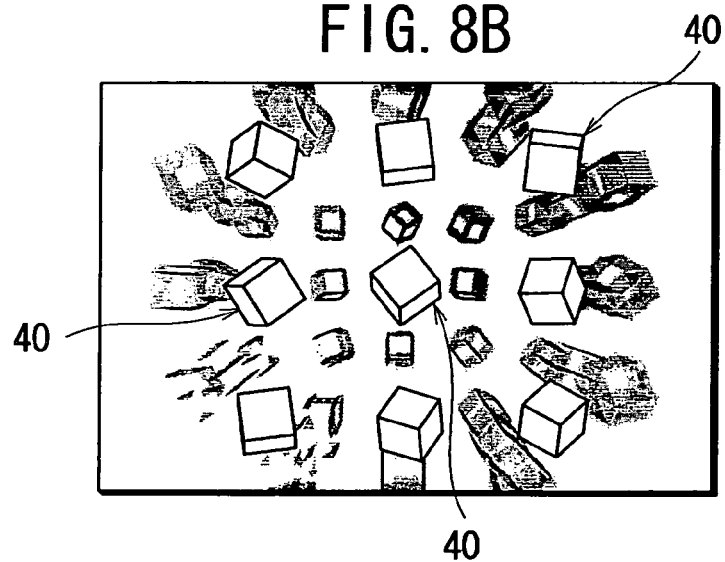

As just one example, FIG. 8A shows a three-dimensional image formed without adding depth of field to objects; FIG. 8B shows a three-dimensional image formed with depth of field added to the objects forming the image in FIG. 8A; and FIG. 8C shows a three-dimensional image formed with an object of attention, which is formed without adding depth of field, and other objects, which are formed with depth of field added thereto.

To begin with, as can be understood from FIG. 8A, by forming a three-dimensional image without adding depth of field to the objects, a three-dimensional image is formed in a state where all objects are in focus. On the contrary, by adding depth of field to the objects, blurring develops on the objects other than the objects in focus in accordance with the distance from those focused objects, similarly to a photograph as shown in FIG. 8B. FIG. 8B is a three-dimensional image in the case where the closest objects 40 are in focus. The blurring developed on the objects further back than these closest objects 40 due to depth of field can be seen in this FIG. 8B.

Figure 8C:
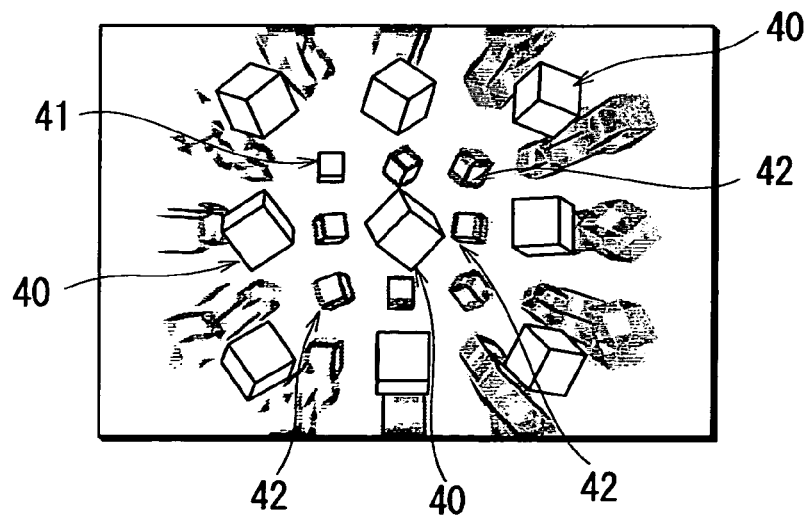

Here, an object 41 as shown in FIG. 8C, for example, is made to be the object of attention. This object 41 is the one whereon blurring develops when the three-dimensional image is formed based on the depth of field since it is further back than the closest objects 40.

However, in the case of this Internet game system according to the third embodiment, the game server apparatus 3 forms a general three-dimensional image in a state wherein the object of attention is in focus despite the depth of field.

In the case of the example shown in FIG. 8C, by adding depth of field, only the closest objects 40 are in a focus, and in addition, other than these objects 40, the object of attention 41 is displayed in focus. Note that blurring generated due to the depth of field on the objects 42, which are at the same depth as this object of attention 41, can be seen.

By forming a general three-dimensional image with such object of attention as being a focused image despite the depth of field, and other objects with depth of field added thereto, objects holding a sense of incompatibility within the three-dimensional image, which is formed based on the depth of field, may be formed. Finally, the object of attention that holds a sense of incompatibility is made to stand out more than the other objects, whereby similar effects as with the above first embodiment may be obtained.

Fourth Embodiment

Next, an Internet game system, according to the fourth embodiment of the present invention, is described. The Internet game system according to this fourth embodiment is the one that makes an object of attention stand out by clearly displaying the object of attention within a three-dimensional image wherein fog has developed.

Note that since this fourth embodiment and each of the above embodiments only differ in this regard, description of only this difference will be made in the following, wherewith duplicate descriptions will be omitted.

Figure 9A:
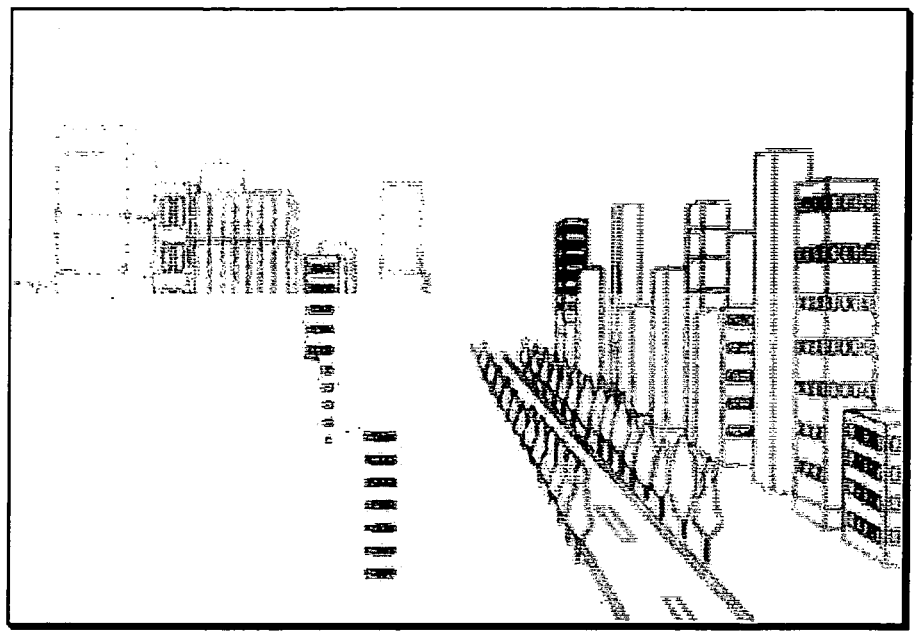
FIG. 9 are diagrams showing examples in which fogging is applied to objects other than the object of attention.

The three-dimensional image shown in FIG. 9A as an example shows a three-dimensional image wherein fog develops on a row of multiple buildings. By developing fog within a three-dimensional image as such, the further away the buildings are from the view point, the more difficult visibility thereof becomes.

Figure 9B:
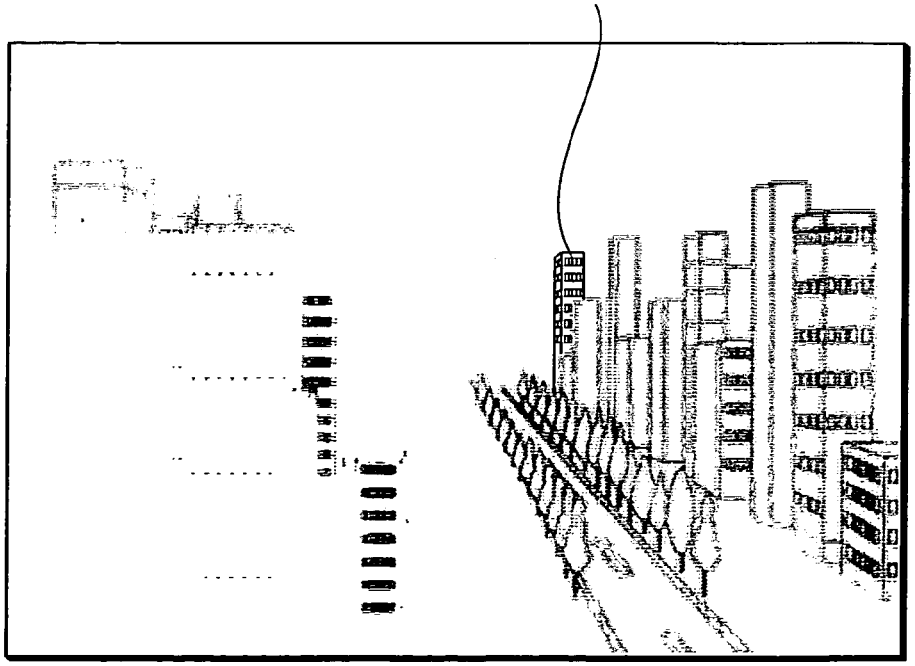

However, in the case of this Internet game system of the third embodiment, the game server apparatus 3, for example as shown in FIG. 9B, forms a general three-dimensional image such that a building 45, which is the object of attention existing in this fog, is clearly displayed (a general three-dimensional image is formed such that the object of attention is clearly displayed despite the fog.)

Accordingly, since only the object of attention is clearly displayed within the three-dimensional image of an entirely blurred impression due to fog, similar effects as with the above first embodiment may be obtained, and this object of attention may stand out.

Fifth Embodiment

Next, an Internet game system, according to the fifth embodiment of the present invention, is described. The Internet game system according to this fifth embodiment is the one that makes an object of attention stand out by clearly displaying the object of attention with brightness (intensity, contrast and the like) differing from that of the other objects.

Note that since this fifth embodiment and each of the above embodiments only differ in this regard, description of only this difference will be made in the following, wherewith duplicate descriptions will be omitted.

Namely, with the Internet game system according to this fifth embodiment, the game server apparatus 3 sets just the contrast (or just intensity, or both contrast and intensity) of the object of attention out of all objects within the three-dimensional image to be higher than that of the other objects.

As a result, since just the object of attention is brightly displayed, similar effects as in the above first embodiment may be obtained, resulting in the standing out object of attention more than the other objects.

Note that just the contrast (or just intensity, or both contrast and intensity) of the object of attention may be set lower than that of the other objects, whereby just this object of attention may be displayed darker than the other objects. Even in this case, since the object of attention may stand out more than the other objects, similar effects as in the above first embodiment may be obtained.

Additional Image Effects According to Paid Amount

Here, as described earlier, with the Internet game system of the respective embodiments, motion blur, magnifying speed/reducing speed, depth of field, fogging, brightness of display and the like are controlled such that the object of attention stands out more than the other objects; however, the additional amount for such image effects may be adjusted in accordance with the amount of money to be paid to the system manager from the advertiser, for example.

Figure 10:
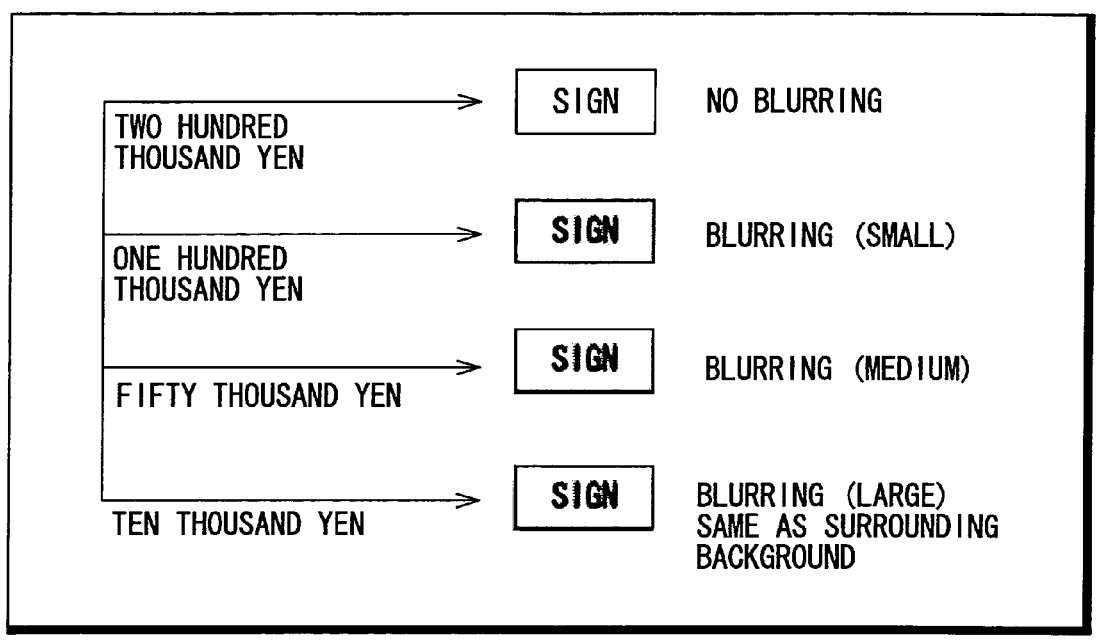
FIG. 10 is a diagram showing an example of a relationship between the blurring amount of motion blur to be added to an object of attention and the display compensation.

FIG. 10, in the case where the object of attention is, for example a "sign", is a diagram showing a relationship between the additional amount of motion blur and the amount of money that the advertiser of this "sign" is to pay to the system manager; however, as can be understood from this FIG. 10, in the case where the highest advertisement rate in this example of, for example, 200 thousand yen is paid to the system manager from the advertiser, the game server apparatus 3 displays this advertiser's sign without adding motion blur thereto. Accordingly, since the advertiser's advertisement is clearly displayed for a user having a moving view point within the virtual space, the advertiser may obtain great advertising effects.

Next, in the case where an advertisement rate of 100 thousand yen, which is half of the above-mentioned highest amount, is paid to the system manager from the advertiser, the game server apparatus 3 adds motion blur with a little blurring to this advertiser's sign, and displays it. Accordingly, since the advertiser's advertisement is displayed to a degree with which text and the like may be recognized by the user having a moving view point within the virtual space, the advertiser may obtain advertising effects in accordance with the amount paid to the system manager.

Next, in the case where an advertisement rate of 50 thousand yen, which is a quarter of the above-mentioned highest amount, is paid to the system manager from the advertiser, the game server apparatus 3 adds motion blur with a moderate amount of blurring to this advertiser's sign, and displays it. Accordingly, since the advertiser's advertisement is displayed to a degree with which text and the like may be recognized if observed closely by the user having a moving view point within the virtual space, the advertiser may obtain advertising effects in accordance with the amount paid to the system manager.

Next, in the case where an advertisement rate of 10 thousand yen, which is the lowest amount, is paid to the system manager from the advertiser, the game server apparatus 3 adds motion blur with the same amount of blurring to this advertiser's sign and the surrounding scenery, and displays it (adds motion blur without differentiating between the sign and scenery). In this case, until the view point stops moving within the virtual space, the user will barely perceive the advertiser's sign.

In this manner, by adjusting the blurring amount of motion blur to be added to the object of attention, such as the advertiser's sign, in accordance with the amount of money, such as the advertisement rate to be paid to the system manager from the advertiser, the advertising frequency may suit the advertiser's desire. In other words, by the advertiser selecting the advertisement rate amount to be paid to the system manager side, the advertiser is able to select a desired advertising frequency.

Note that the above description is of the case where motion blur is utilized as an image effect, however, cases of utilizing other image effects are also the same.

For example, in the case of changing the magnifying speed/reducing speed, the larger the difference of magnifying or reducing speed is between the object of attention and the other objects, the more the object of attention stands out. As a result, the difference of magnifying or reducing speed between the object of attention and the other objects may be adjusted (the smaller the difference, the smaller the degree of standing out) in accordance with the amount of money to be paid from the advertiser to the system manager.

Furthermore, in the case of utilizing depth of field as an image effect, the additional amount of depth of field to be added to the object of attention may be adjusted in accordance with the amount of money to be paid from the advertiser to the system manager.

Furthermore, in the case of utilizing fogging as an image effect, the additional amount of fog to be added to the object of attention may be adjusted in accordance with the amount of money to be paid from the advertiser to the system manager.

Moreover, in the case of controlling the brightness of display, the brightness when displaying the object of attention may be adjusted in accordance with the amount of money to be paid from the advertiser to the system manager.

Namely, it is to be understood that the degree of the object of attention standing out should be changed in accordance with the amount of money to be paid to the system manager.

Additional Image Effects According to Level of Importance

Next, the additional amount of such image effects may be adjusted in accordance with the level of importance of the object of attention.

As shown in FIG. 10, for information of a high level of importance that all users should recognize, such as this system's maintenance information, for example, the game server apparatus 3, even in the case where the moving operation is performed on the user's view point, displays the sign describing this information without adding motion blur thereupon. Accordingly, since the information of a high level of importance is clearly displayed for the user that has a moving view point in the virtual space, the important information may be perceived by the user.

Similarly, for information of a medium level of importance, the game server apparatus 3, in the case where the moving operation is performed on the user's view point, adds motion blur with a little amount of blurring to the sign describing this information, and displays the sign. Accordingly, since the information of a moderate level of importance is displayed to a degree that the information can be nearly recognized by the user who has a moving view point in the virtual space, the displayed information may be perceived by almost every user.

Similarly, for information of a low level of importance, the game server apparatus 3, in the case where the moving operation is performed on the user's view point, adds motion blur with a moderate amount of blurring to the sign describing this information, and then displays the sign. Accordingly, since the information of a low level of importance is displayed to a degree that the information can be vaguely recognized by the user who has a moving view point in the virtual space, the displayed information may be perceived by users to a certain extent.

Similarly, for information of an even lower level of importance, the game server apparatus 3, in the case where the moving operation is performed on the user's view point, adds motion blur with an amount of blurring that corresponds to this view point moving operation on the sign describing this information, and then displays the sign. Accordingly, the object of attention will be added with the same amount of blurring of motion blur as that of the other objects.

In this manner, in accordance with the level of importance of the information, by adjusting the amount of blurring to be added by motion blur to an object such as a sign describing that information, the higher the level of importance of the information, the easier it is to make the user perceive the information.

Note that the above description is of the case where motion blur is utilized as an image effect, however, cases of utilizing other image effects are also the same.

For example, in the case of changing the magnifying speed/reducing speed, the larger the difference of magnifying or reducing speed is between the object of attention and the other objects, the more the object of attention stands out. As a result, the difference of magnifying or reducing speed between this object of attention and the other objects may be adjusted (the smaller the difference, the smaller the degree of standing out) in accordance with the importance level of the information.

Furthermore, in the case of utilizing depth of field as an image effect, the additional amount of depth of field to be added to the object of attention may be adjusted in accordance with the importance of the information.

Furthermore, in the case of utilizing fogging as an image effect, the additional amount of fog to be added to the object of attention may be adjusted in accordance with the importance of the information.

Moreover, in the case of controlling the brightness of display, the brightness when displaying the object of attention may be adjusted in accordance with the importance of the information.

Namely, it is to be understood that the degree of the object of attention standing out may be changed in accordance with the importance of the information.

Sixth Embodiment

Next, the sixth embodiment of the present invention is described. Each of the above embodiments are those that applied the present invention to the Internet game system which runs a video game within the three-dimensional space provided by the game server apparatus 3; however, this sixth embodiment is the one that applies the present invention to a Web browser that downloads Web page data from a Web server apparatus, which is linked to a network, and displays it.

Note that since this sixth embodiment and each of the above embodiments only differ in this regard, description of only the difference will be made in the following, wherewith duplicate descriptions will be omitted.

Structure of the Sixth Embodiment

In the case of this sixth embodiment, the client terminal apparatus 2 shown in FIG. 1 downloads Web page data from a Web server apparatus 6, which is linked to a network 1 based on a Web browser, and displays text, images and the like of the Web page based on this downloaded data upon a monitor device 5.

The Web page data to be downloaded on the client terminal apparatus 2 has at least data of text and/or images, which is the displayed content of that Web page, data showing the object of attention (text, images and the like), and a display control program, which controls image effects for making the object of attention stand out when performing the scrolling operation or magnifying/reducing operation. The client terminal apparatus 2, while the user is performing the scrolling or magnifying/reducing operation, performs display control of the Web page based on this display control program such that the object of attention stands out by utilizing a predetermined image effect.

Display Control Operation of Client Terminal Apparatus

Figure 11:
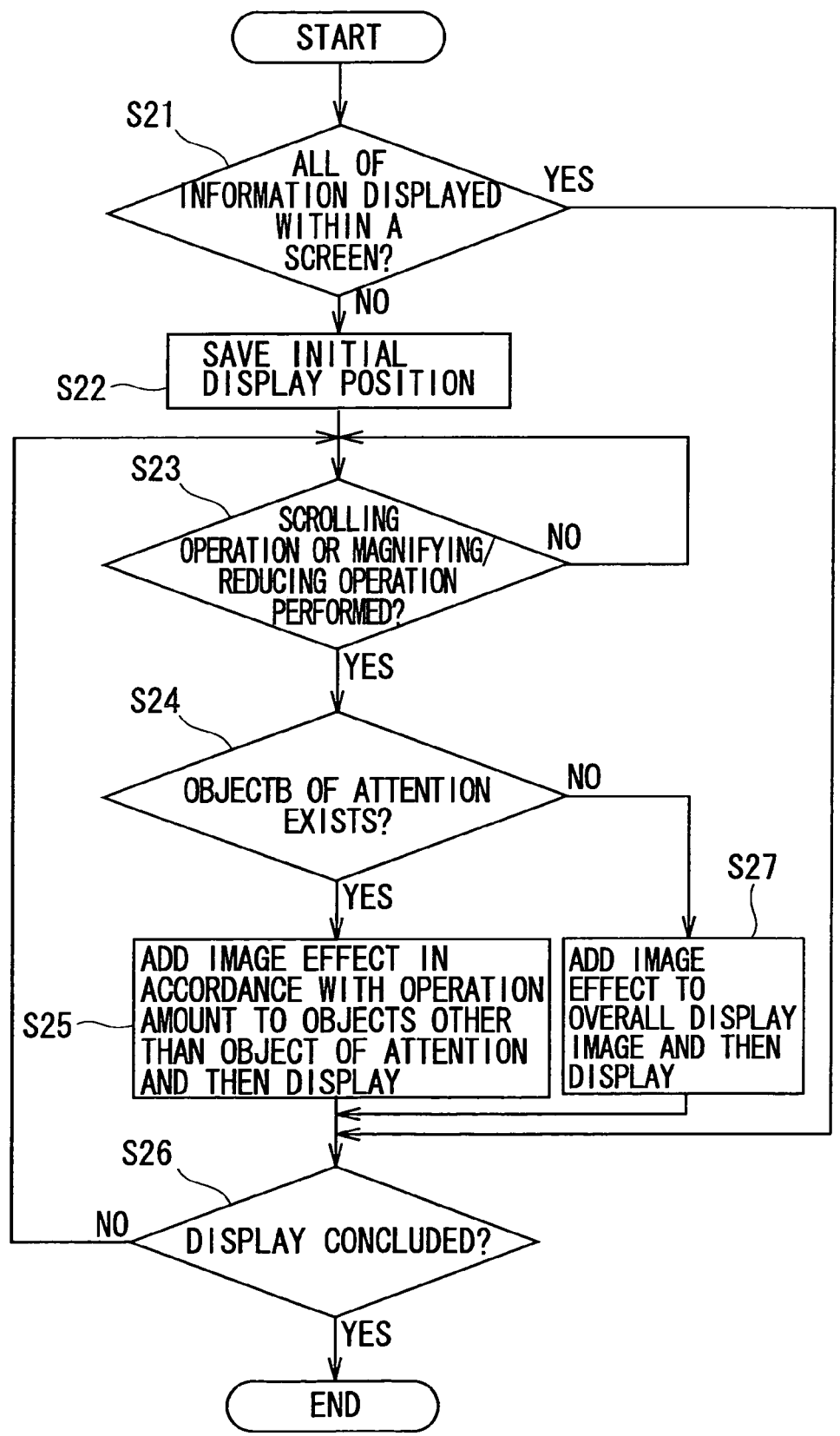
FIG. 11 is a flowchart for explaining the steps of display control to be performed so as for indices of attention to stand out when the scrolling operation or magnifying/reducing operation is performed on text and the like displayed on the display screen.

Next, the steps of display control of the client terminal apparatus 2 is described using the flowchart shown in FIG. 11. To begin with, the flowchart shown in this FIG. 11 starts when the WWW browser, which is provided to the client terminal apparatus 2, establishes a communication link between this client terminal apparatus 2 and a Web server apparatus 6 on the network 1 shown in FIG. 1, and displays upon the monitor device 5 a Web page downloaded from this Web server apparatus 6.

Note that at this point, as data of the aforementioned Web page, at least data of text and/or images, which is the displayed content of that Web page, data showing the object of attention (text, images and the like), and a display control program, which controls the image effects for making the object of attention stand out when the scrolling or magnifying/diminishing operation is performed, are downloaded to the client terminal apparatus 2.

Next, in step S21, the control unit of the client terminal apparatus 2 determines whether or not all contents of the Web page downloaded from the Web server apparatus 6 such as text, images and the like are completely displayed within the display screen of the monitor device 5 (whether or not all contents of the Web page are displayed). As for this determination, in the case of Yes, since all the contents of the Web page are displayed within the display screen of the monitor device 5, the user does not need to scroll for looking at non-displayed contents. As a result, this display control procedure proceeds to step S26. Otherwise, as for this determination, in the case of No, this display control procedure proceeds to step S22.

Next, in step S22, since all the contents of the Web page are not displayed within the display screen of the monitor device 5, the control unit of the client terminal apparatus 2 saves the initial position of that display screen. Accordingly, this display control procedure proceeds to step S23.

Next, in the case where all the contents of the Web page cannot be displayed within the display screen of the monitor device 5, the control unit of the client terminal apparatus 2 controls a scroll bar for scrolling the display screen to display it. When this scroll bar is dragged by the user, the control unit displays while scrolling the display screen; however, in step S23, the control unit determines whether or not the scrolling operation, which is this user's dragging operation, is performed. Then, until the scrolling operation is detected, control for displaying the Web page is continued as is, and at the timing of when the scrolling operation or magnifying/reducing operation is detected, this display control procedure proceeds to step S24.

Note that in this step S23, it is also determined whether or not the magnifying/reducing operation on the desired text, images and the like is performed by the user; however, this display control procedure of the case where the magnifying/reducing operation is performed will be described later.

In step S24, the control unit determines whether or not data indicating an object of attention downloaded from the Web server apparatus 6 exists, thereby determining whether or not the object of attention exists within all the contents of the Web page. In the case where the object of attention exists, this display control procedure proceeds to step S25; whereas in the case where the object of attention does not exist, this display control procedure proceeds to step S27.

In step S27, since the object of attention does not exist, the control unit adds motion blur to the entire display screen in accordance with the user's scrolling operation amount and the initial display position of the display screen, which are saved in the above-mentioned step S22, and then displays the screen. Accordingly, this display control procedure proceeds to step S26.

On the contrary, in step S25, since the object of attention does exist, the control unit performs display control, whereby motion blur is added to the objects other than the designated objects of attention in accordance with the user's scrolling operation amount and the initial display position of the display screen, which are saved in the above-mentioned step S22. Accordingly, this display control procedure proceeds to step S26.

Figure 12:
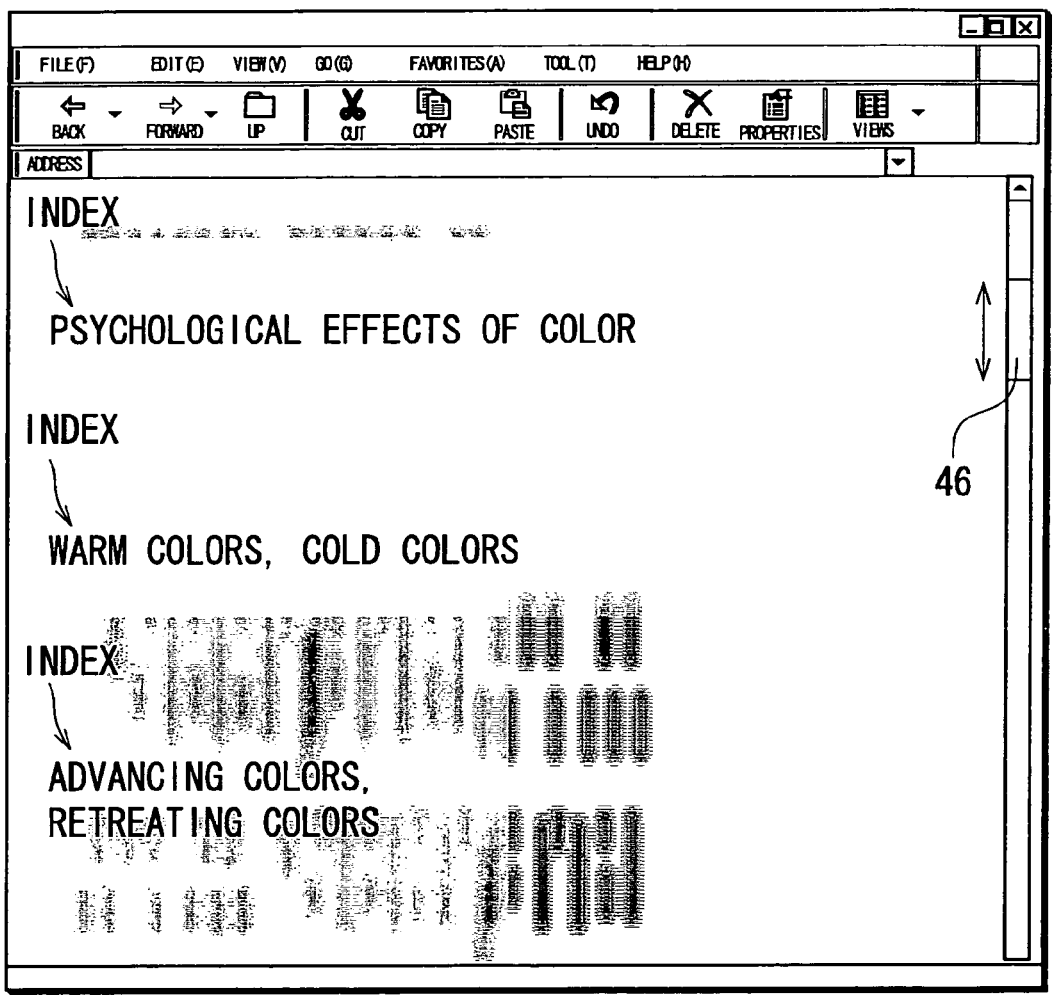
FIG. 12 is a diagram showing a state where the indices of attention are displayed so as to stand out even in the case where the display screen is scrolled.

An example of a display screen, which is displayed with motion blur added to the objects other than the designated objects of attention in accordance with the user's scrolling operation amount, is shown in FIG. 12.

The example shown in this FIG. 12 is of the case where the respective text of "Psychological Effects of Color", "Warm Colors, Cold Colors", and "Advancing Colors, Retreating Colors", which are the indices of the Web page, are designated as the objects of attention. The user drags up and down a scroll bar 46, which is displayed on the Web page, as indicated by the arrow signs in FIG. 12, thereby designating to scroll and display the Web page. The control unit of the client terminal apparatus 2 adds motion blur to the objects other than the respective text of "Psychological Effects of Color", "Warm Colors, Cold Colors", and "Advancing Colors, Retreating Colors", which are the objects of attention, in accordance with the user's amount of the dragging operation as mentioned earlier, and then display. Accordingly, despite that drag operating is performed by the user, each text of "Psychological Effects of Color", "Warm Colors, Cold Colors", and "Advancing Colors, Retreating Colors", which are the objects of attention, are clearly displayed as shown in FIG. 12.

In the case where a specific keyword is arranged on the Web page, by directly entering that keyword and searching, the desired text, passages and the like within the Web page may be found. However, in the case of carrying out the task of finding a desired text and the like while scrolling the display screen by skipping, scanning or the like, if motion blur happens to be added to all of the text of the display screen, recognition of the desired text and the like becomes difficult as a result of the blurring that is added to the text and the like to be scrolled, making it difficult to find the desired text and the like.

In the case of the Web browser of this embodiment, when a producer creates a Web page by designating the indices and the like of the Web page as the objects of attention, even when scrolling the display screen, these indices of attention can be displayed without having motion blur added thereto. As a result, it is easier for the user, who is skipping and scanning, to perceive the indices and the like, and it is easier to find necessary information such as the desired text.

Operations According to Magnifying/Reducing Operation

Next, the above description is of the case where the scroll bar is scrolled by the user whereby the text of attention is made to stand out by adding motion blur to the text other than the text of attention; however, the following will describe the case where the user's magnifying/reducing operation is detected in the aforementioned step S23.

Namely, in the above-mentioned step S23, if the control unit detects the user's magnifying/reducing operation, the presence of objects of attention is determined in step S24. Then, in the case where there are objects of attention, in step S25, the magnifying or reducing speed of the objects of attention such as text or images or the like are made to differ from that of the other objects; and in addition, motion blur corresponding to this magnifying or reducing speed is added to the objects other than the objects of attention, displaying the objects of attention without adding motion blur thereto.

Figure 13:
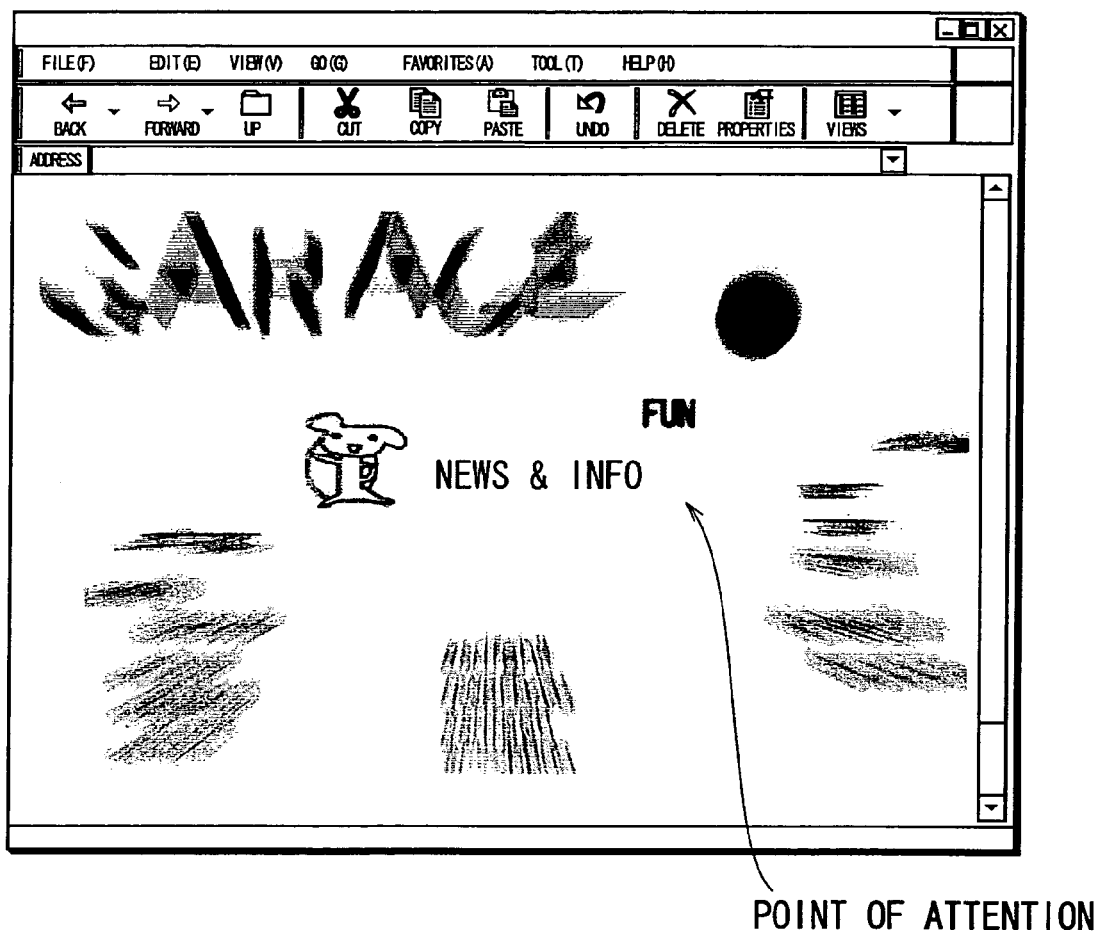
FIG. 13 is a diagram showing a state where the indices of attention are displayed so as to stand out even in the case where the magnifying/reducing operation is performed on the display screen.

An example of a displayed image with such image effect added thereto is shown in FIG. 13. In the case of the displayed image shown in this FIG. 13, the text "News & Info" displayed in the center of the display screen is shown as the point of attention. In this FIG. 13, as can be understood by comparing the text of attention and the other surrounding objects, in addition to this text of attention being magnified or reduced at a speed differing from that of the objects such as other text, since motion blur is not added thereto, it is displayed as distinctly standing out.

Accordingly, even in the case where the user performs the magnifying/reducing operation, the objects of attention such as indices, for example, may be made to stand out, whereby necessary information such as desired text is easier to find.

Note that in this example, both the image effects: one that adds motion blur to the objects other than the objects of attention, and one that displays the magnified or reduced objects of attention at a magnifying or reducing speed differing from that of the other objects, are used in combination; however, only one of them may be utilized.

Furthermore, the brightness (intensity, contrast and the like) of the objects of attention may be displayed at a brightness differing from that of the other objects. Even in this case, since the objects of attention are displayed brighter or darker than the other objects, the point of attention such as indices may be displayed as standing out.

Automatic Detection of Point of Attention

Next, in the above description, the producer creates the Web page by pre-designating the objects of attention, and the client terminal apparatus controls displaying by utilizing an image effect such as motion blur such that the point of attention designated by this producer stands out. However, for a Web page that is not designated with such point of attention, the client terminal apparatus 2 detects the point of attention and performs display control so as to stand it out as in the following.

Namely, there are many cases where the portions that the producer wants to emphasize such as the indices and important sections within the passages are displayed with a display color or size differing from that of objects such as other text.

As a result, the above-mentioned control unit, in step S24 of the flowchart shown in FIG. 11, determines the presence of the object of attention by detecting the presence of objects such as text or images of a specific color, and of objects such as text or images larger than a predetermined size. Then, in the case where the presence of such object of attention is detected, in step S25, display control is performed by adding an image effect such as motion blur to the objects other than this object of attention.

As a result, even in the case where a point of attention is not pre-designated when creating the Web page, the object that should be the point of attention may be automatically detected and displayed so that it stands out.

Seventh Embodiment

Next, an Internet game system according to the seventh embodiment that the present invention is applied is described.

Each of the above embodiments is the one that adds motion blur and the like to everything except an object such as a sign of attention while the view point is moving, and displays so as for the object, such as a sign, to stand out. Accordingly, the user may visually perceive the above object such as a sign.

On the contrary, in this seventh embodiment, the controller 4 is vibrated and/or the applied pressure necessary for operating the buttons of the controller 4 is changed in accordance with the distance, angle and the like between the view point and the object of attention, thereby allowing the user to visually perceive the above object such as a sign.

An Example of Pressure Variable Function

As previously mentioned, the controller 4 is provided with a vibration function (vibration motor 9 which allows such control, and a pressure variable function (pressure control unit 8). Among these, the pressure variable function is configured as follows.

Configuration of ○ Button

Figure 14A:
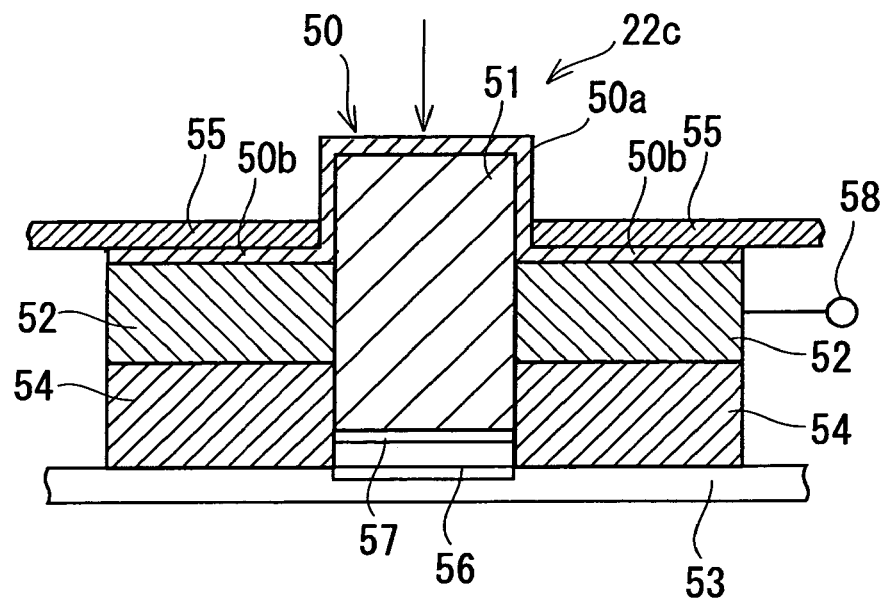
FIG. 14 are cross-sectional views of a ○ button, which is provided on the controller, in a non-depressed state and depressed state.
Figure 14B:
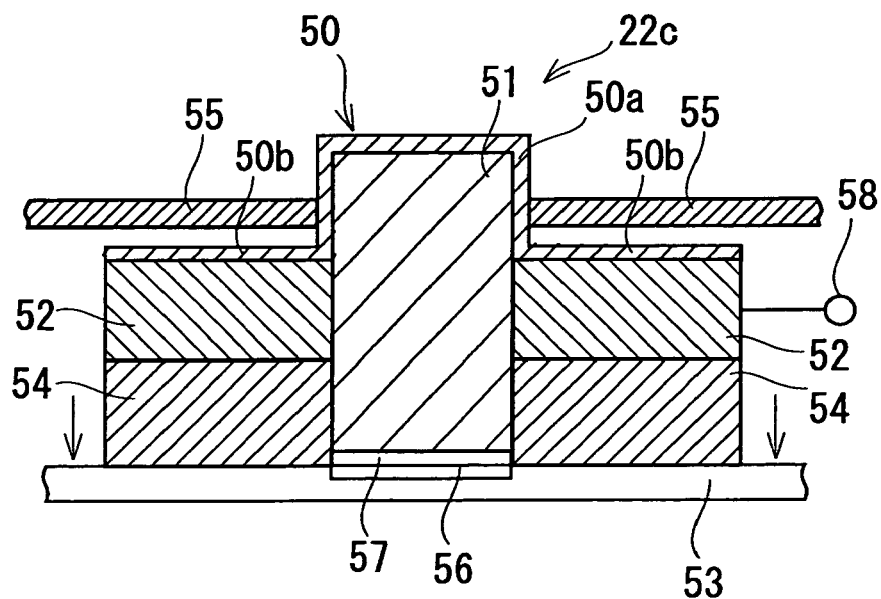

FIG. 14A, FIG. 14B are diagrams of the ○ button 22c cut in a straight line along the height, whereby these cross sections are seen from the front side. As can be understood from FIG. 14A and FIG. 14B, the ○ button 22c has a convex button cover 50; an electrode spacer 51 of a predetermined length provided in a form whereby a portion is buried within this convex button cover 50; a piezo element 52, which is provided enclosing this electrode spacer 51; a substrate 53; and a spacer 54, which is an elastic member such as, for example, rubber or sponge, provided so as to fill in the gaps between the piezo element 52 and substrate 53.

The convex button cover 50 is formed of a protruding part 50a and a flange part 50b, wherein the protruding part 50a is provided so that a fixed portion protrudes from a cover 55 of the second operation part 22.

An electrode 57, which distributes power when making contact with an electrode 56 provided upon the substrate 53, is provided on the electrode spacer 51 on the side opposite to the button cover 50.

The piezo element 52 is connected to the client terminal apparatus 2 via a voltage applying terminal 58 which changes the thickness along the height of the ○ button 22c in accordance with the voltage applied from the client terminal apparatus 2.

Depression Operation Under Normal Conditions

In regards to the ○ button 22c having such configuration, FIG. 14A shows a non-depressed state of the ○ button 22c when voltage is not applied to the piezo element 52; and FIG. 14B shows a depressed state of the ○ button 22c when voltage is not applied to the piezo element 52.

As can be understood from FIG. 14A, in the case of the non-depressed state of the ○ button 22c, the electrode 57, which is provided on the electrode spacer 51, does not make contact with the electrode 56, which is provided upon the substrate 53. In this state, by applying pressure to the protruding part 50a of the button cover 50 as indicated by the arrow in FIG. 14A, the spacer 54, which is formed of an elastic member, is transformed into a crushed shape by the flange part 50b of the button cover 50 via the piezo element 52 as shown in FIG. 14B. Then, the electrode 57, which is provided on the electrode spacer 51, makes contact with the electrode 56, which is provided upon the substrate 53, so as to allow conductance. The client terminal apparatus 2 detects that the ○ button 22c is depressed as a result of this conductance.

Variable Control of Force Necessary for Depression

Figure 15A:
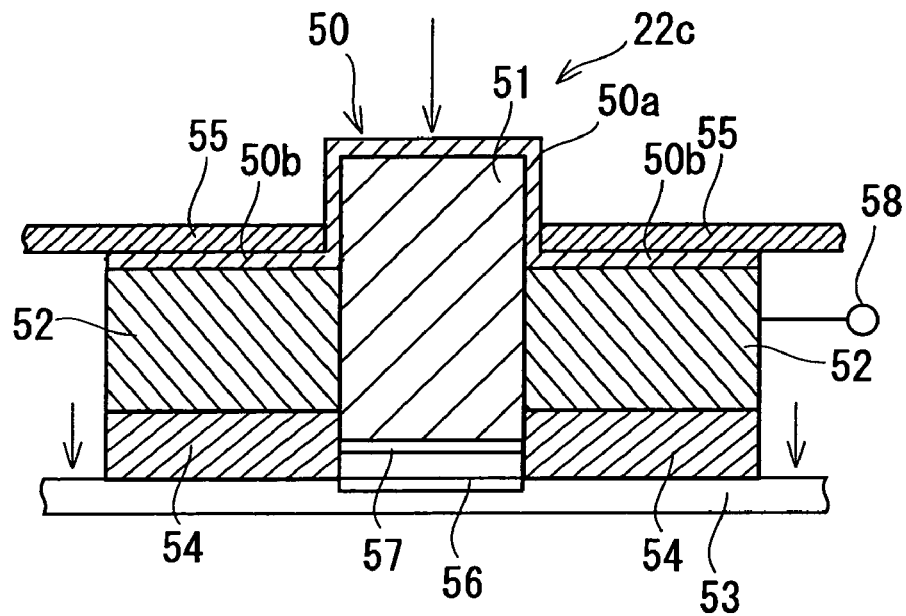
FIG. 15 are cross-sectional views showing the state where the thickness of a piezo element has changed as a result of applying voltage to the piezo element, which is provided on the ○ button that is provided on the controller.
Figure 15B:
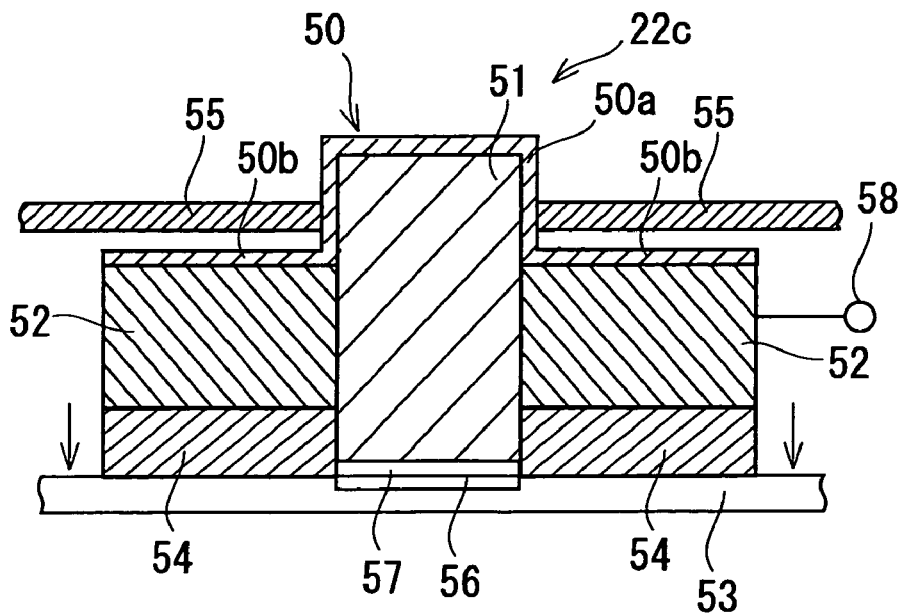

Next, FIG. 15A shows the condition wherein voltage is applied to the piezo element 52. As can be understood from this FIG. 15A, if voltage is applied to the piezo element 52, it is transformed increasing the thickness of the ○ button 22c along its height in accordance with this applied voltage. Accordingly, the spacer 54 is crushed and transformed for the equivalence of the increased thickness of this piezo element 52.

Note that since the piezo element 52 and the spacer 54 are respectively provided so as to surround the electrode spacer 51, the electrodes 56, 57 are made so as not to respectively make contact just by applying voltage to the piezo element 52.

Next, by performing the depressing operation on the ○ button 22c in the state where the spacer 54 is crushed by the piezo element 52 as such, the spacer 54 is transformed through further crushing by the flange part 50b of the button cover 50 via the piezo element 52, whereby the electrodes 56, 57 make contact so as to allow conductance. However, in this case, before the ○ button 22c is depressed, the spacer 54 is further crushed by the piezo element 52 for just the voltage applied to the piezo element 52. As a result, in order to depress this ○ button 22c, more pressure than normal becomes necessary.

Namely, in the case of this embodiment, since the voltage applied to the piezo element 52 is variably controlled by the client terminal apparatus 2, the thickness of the piezo element 52 varies in accordance with the distance, angle and the like between the view point and the object of attention.

Note that in this case, the pressure necessary for depressing the ○ button 22c is variably controlled; however, the pressure necessary for depressing the respective up, down, left and right direction buttons 21a to 21d of the first operation part 21 may be variably controlled. Furthermore, the inclined operation pressure necessary for operating each of the analog operation parts 23R, 23L at an inclination may also be variably controlled.

Furthermore, this example is of the case of the controller 4 as the operating means; however, this is the same even if it is the case of an input device such as a keyboard or mouse device. Namely, in the case of the keyboard as the operating means, a pressure variable means such as the above-mentioned piezo element may be provided between the cover of each key and the contact part therewith. Furthermore, in the case of the mouse device as the operating means, by providing a pressure variable means such as the above-mentioned piezo element between the cover of the operation button and the contact part therewith, the same effects may be obtained as in the case of the above controller 4.

Control Procedure

Figure 16:
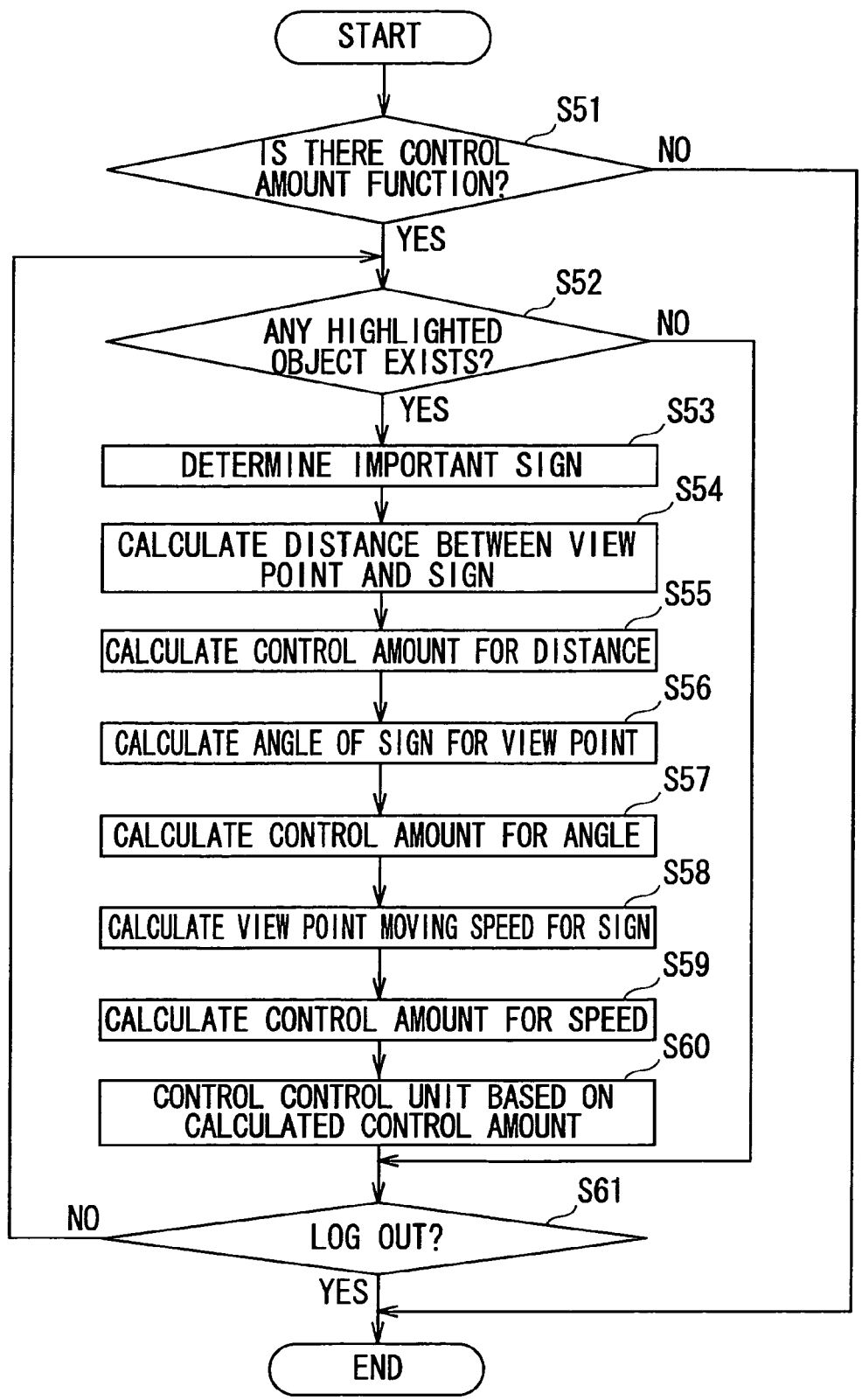
FIG. 16 is a flowchart for explaining the steps of a control procedure of a network system according to the seventh embodiment of the present invention.

Next, the steps of the control procedure will be described using the flowchart in FIG. 16. Note that the following describes control, which varies the weight of a "button", and control, which varies the amplitude of a "vibration", as used in combination.

This flowchart starts when the user logs in to a virtual world that is formed by this network game system.

In step S51, the client terminal apparatus 2, by carrying out communications with the controller 4, determines whether or not that controller 4 has, for example, a pressure variable function or a vibration function, which is a function corresponding to the control in this case. Then, in the case where it is determined that the controller 4 is not provided with the control function, since the control can not be performed for that controller 4, the client terminal apparatus 2 ends the implementation of this flowchart.

On the contrary, in the case where it is determined that the controller 4 is provided with the control function, since control for that controller 4 is possible, the client terminal apparatus 2 progresses this control procedure to step S52.

In step S52, the client terminal apparatus 2 detects the view point moving operation performed by the user, that is logged into the virtual world, using the controller 4, and determines whether or not a highlighted object such as a sign, for example, is near the user's transferred position. Then, the client terminal apparatus 2, in the case where a highlighted object does not exist, progresses this control procedure to step S61; and in the case where a highlighted object does exist, progresses this control procedure to step S53.

In step S53, the client terminal apparatus 2 detects the sign that has matter of the utmost importance displayed thereupon out of the objects that should be highlighted existing near the user's transferred position. If the sign is an advertisement, the sign, which is paid the highest advertising rate, may be designated as the "utmost important sign". Note that in this step S53, several signs may be detected in order from the highest level of importance.

In step S54, the client terminal apparatus 2 calculates the distance between the user's view point and the above-mentioned object that has matter of the utmost importance displayed thereupon. In step S55, the client terminal apparatus 2 calculates the amount of control (vibrating amount of the vibration function, the intensity of pressure necessary for depressing a button and the like) that corresponds to the above-mentioned distance calculated in the above-mentioned step S54.

In step S56, the client terminal apparatus 2 calculates the angle between the user's view point and the above-mentioned highlighted object. In step S57, the client terminal apparatus 2 calculates the aforementioned amount of control for the angle detected in the above-mentioned step S56.

In this case, as the above-mentioned angle becomes smaller, the amount of control may gradually be increased. Otherwise, control may be performed when a sign exists in the angle of field, and control may not be performed when a sign does not exist in the angle of field.

In step S58, the client terminal apparatus 2 calculates the moving speed of the view point with respect to the aforementioned sign. In step S59, the client terminal apparatus 2 calculates the above-mentioned amount of control for the user's moving speed that is calculated in the above-mentioned step S58. In this case, as the above-mentioned moving speed becomes faster, the amount of control gradually increases.

In step S60, the client terminal apparatus 2, based on the amount of control calculated in the above-mentioned step S54 to step S60, controls the buttons of the controller 4 and/or the vibration function.

Specifically, the client terminal apparatus 2, with the sign in the user's angle of field and as the user's view point approaches the above-mentioned highlighted object, controls the vibration motor 9 of the controller 4 so that the vibrating amount of the controller 4 gradually increases. Furthermore, as the user's moving speed increases, a pressure control unit 8 (for example, the above-mentioned piezo element 52 and the like) of the controller 4 is controlled so that the pressure necessary for depressing the buttons of the controller 4 gradually increases.

Finally, the client terminal apparatus 2, in step S61, determines whether or not the user has logged out of the virtual world. Then, in the case of not being logged out, the above control is repeated in step S52 to step S60. On the contrary, in the case where the logging out of the user is detected, the implementation of this flowchart concludes.

Effects of the Seventh Embodiment

The case where the user's moving speed is fast indicates that the user moves through the virtual world with a so-called "skipping through a book" sensation. As a result, the probability of overlooking important information is high.

However, in the case of the network game system of this embodiment, according to the angle of field and the distance between the view point and the important object, it is made so that motion blur is not applied to this important object, as well as the force necessary for button operating is increased as the moving speed increases; in addition, since vibrations of the controller 4 are controlled, it may tactilely attract the attention of the user that moves within the virtual world by the above-mentioned sense of skipping through a book. Furthermore, by controlling the amount of control in accordance with the angle of field and the distance between the view point and important object, tactile effects may be aided.

Accordingly, inconveniences such as overlooking important information when the user is quickly moving through the virtual world may be prevented.

Note that the above-mentioned control may also be performed in consideration of the distance between the view point and object, and the user's angle of field, as well as the moving speed of the user's view point. In this case, as the moving speed of the user's view point becomes faster, the amount of control gradually increases.

Furthermore, in the case where control is performed based on the angle of field, only when there is an important sign therein, overlooking of important information can be prevented by performing the control.

On the contrary, control may be performed for signs and the like that are not within the angle of field. In this case, the objects that are unsighted by the user may be made to stand out.

In this manner, by simultaneously stimulating the user's senses of sight and touch, in the case of "making important things stand out", effective results may be obtained.

Note that in the case of this example, control which varies the weight of a "button", and control which varies the amplitude of a "vibration", are used in combination; however, either one or the other control may be performed as well. Otherwise, in accordance with the level of importance and the like of the information, each above-mentioned control may be selectively used.

Modified Example of the Seventh Embodiment

The description mentioned above is the one that visibly and tactilely expresses the actual condition of a network and the like; however, unique sounds (voice, music, beep sounds and the like) may be determined according to the importance of information displayed on a sign, and according to the distance and angle between the view point therewith, the above-mentioned sounds may be produced from the speaker device 7 shown in FIG. 1. For example, the above-mentioned speaker device 7 is controlled so that a large sound is gradually produced as the view point approaches the sign; and on the contrary, the above-mentioned speaker device 7 is controlled so that a small sound is gradually produced as the view point approaches the sign.

By independently utilizing such voice feedback control, the user may auditorily perceive the presence of a sign and the like. Furthermore, by using this voice feedback control in conjunction with visual control such as the above-mentioned motion blur and the tactile control, the user may be made to visually, tactilely and auditorily perceive the presence of an object such as a sign. Therefore, the inconvenience of the user overlooking important information and the like may be further prevented.

Eighth Embodiment

Next, an Internet game system according to the eighth embodiment of the present invention is described. Each of the above embodiments are those that perform alternative control, which adds or does not add image processing such as motion blur to an object of attention.

The Internet game system of this eighth embodiment is the one allowing setting for each and every object the additional amount of image processing (amount of effects) to be added thereto.

Structure of the Eighth Embodiment

In the case of the Internet game system of this eighth embodiment, the game server apparatus 3 as shown in FIG. 1 has a parameter database 11 (parameter DB), which is stored with parameters for each and every object indicating the amount of effects to be added thereto.

Furthermore, each client terminal apparatus 2 has a secondary storing medium device such as a hard disc drive 10 (HDD), for example, which stores the parameters for each object that are downloaded from the parameter DB 11 of the game server apparatus 3.

The client terminal apparatus 2, by downloading the parameters for respective objects, forms a parameter table for the respective objects within this HDD 10. Then, the client terminal apparatus 2, when the user performs the view point moving operation, reads out the parameters for each object from this parameter table, and adds image processing for the effect amount that corresponds to these parameters so as to render each object.

An example of the parameter table, which is formed within the above-mentioned HDD 10, is shown in FIG. 17. As shown in this FIG. 17, the parameter table is formed with identification information (ID) of each object; information indicating the attribute of each object; information indicating the effect amount of each object; and information indicating the variable range of the effect amount that the user is able to vary therewith.

Specifically, in the case of an object with an attribute of a first building, the ID "1" is attached thereto, and in the case of an object with an attribute of a second building, the ID "2" is attached thereto. Furthermore, in the case of an object with an attribute of a first sign, the ID "3" is attached thereto, and in the case of an object with an attribute of a second sign, the ID "4" is attached thereto. Furthermore, in the case of an object with an attribute of a tree, the ID "5" is attached thereto, and in the case of an object with an attribute of a car, the ID "6" is attached thereto. Moreover, in the case of an object with an attribute of a telephone pole, the ID "7" is attached thereto, and in the case of an object with an attribute of a person, the ID "n (n is a natural number)" is attached thereto.

The user may vary the effect amount of image processing, which is added to each object, excluding a few. For example, in the case of an object of the first building, the effect amount is variable in the range of "0~10", and in the case of an object of the second building, the effect amount is variable in the range of "5~10". Furthermore, in the case of an object of the first sign, the effect amount is variable in the range of "0~5"; on the contrary, in the case of an object of the second sign, modification of the effect amount is "disapproved". Furthermore, in the case of an object of the tree, the effect amount is variable in the range of "0~8", and in the case of an object of the car, the effect amount is variable in the range of "0~10". Moreover, in the case of an object of the telephone pole, changing the effect amount is possible in the range of "0~10", and in the case of an object of the person, changing the effect amount is possible in the range of "5~10".

Note that an object of the second sign is, for example, a sign describing important information such as maintenance information and the like of the game server apparatus 3. As a result, solely the manager is allowed to change the effect amount for the object of the second sign (the user is not able to change the effect amount of this second sign.)

Such effect amounts of respective objects are respectively set to predetermined initial values when a parameter table is formed. However, if change in the effect amount is specified by the user, the client terminal apparatus 2 displays the above-mentioned parameter table on the monitor device 5.

The user, by having the parameter table displayed on this monitor device 5, recognizes the effect amounts for the respective objects, and performs the changing operation for the effect amount of the desired object via the controller 4.

For example, in the case of this example shown in FIG. 17, in regards to an object of the first building that the effect amount is allowed to be changed in the range of "0~10", if the effect amount is set as "8" by the user, the client terminal apparatus 2 writes in the effect amount "8" for the object of the first building of the parameter table as shown in FIG. 17.

Similarly, in regards to an object of the person that the effect amount is allowed to be changed in the range of "5~10", if the effect amount is set as "10" by the user, the client terminal apparatus 2 writes in the effect amount "10" for the object of the "person" of the parameter table as shown in FIG. 17.

The client terminal apparatus 2 reads out the parameter table that is customized by the user as such when image rendering the respective objects, and adds the effect of a specified effect amount for each and every object so as to perform the image rendering process.

Note that in this example, the effect amount may be set for each and every object, for example, each and every building, tree and the like. However, the effect amounts may be uniformly determined in accordance with the object's attributes such as, for example, the same effect amount for all the objects that are buildings, or the same effect amount for all the objects that are telephone poles.

Operations of the Eighth Embodiment

Next, the operations of image rendering processing using this parameter table will be described using the flowchart in FIG. 19. This flowchart starts when the aforementioned parameter table is formed in the HDD 10 of the client terminal apparatus 2 by downloading from the game server apparatus 3 the parameters for each object.

In step S71, the client terminal apparatus 2, for the first object from which the effect amount should be read out, sets the object's ID to "1", which is the initial value (i=1).

Next, in step S72, the client terminal apparatus 2 refers to the parameter table that is stored in the HDD 10; in step S73, detects the effect amount of the object having the ID "1", to storing in a storing medium such as an internal memory.

Next, in step S74, the client terminal apparatus 2 determines whether or not the effect amounts of all objects stored in the parameter table are detected. Then, in the case where detection of the effect amount of all objects is completed, this image rendering procedure proceeds to step S75; and in the case where detection of the effect amount of all objects is not completed, this image rendering procedure proceeds to step S77.

In step S77, since detection of the effect amount of all objects is not completed, the client terminal apparatus 2 increments by "1" the pre-set object's ID value (i), returning this image rendering procedure to step S72.

Then, in the above-mentioned step S74, until it is determined that detection of the effect amount of all objects is completed, the effect amounts of all objects is detected by incrementing by "1" the object's ID value.

Next, in step S75, the client terminal apparatus 2 detects the user's view point based on the operating state of the controller 4, and loads the object according to this view point. Then, image rendering is performed to each of these objects by adding a predetermined effect so that the effect amount is stored in the above-mentioned internal memory. Accordingly, image rendering may be performed on the image formed of each of the objects, which has an effect of a pre-set effect amount added thereto. Therefore, for example, an image without any effects added to the object of attention, or an image that has an effect of a small effect amount added to the object of attention may be formed by setting the effect amount for each of the above-mentioned objects.

Next, in step S76, the client terminal apparatus 2 detects operation status of the controller 4, thereby determining whether or not logging out of the virtual world is specified by the user. In the case where logging out of the virtual world is not specified by the user, the client terminal apparatus 2, returns the image rendering procedure to the above-mentioned step S75, and continues implementing the image rendering process according to the user's view point.

Figure 19:
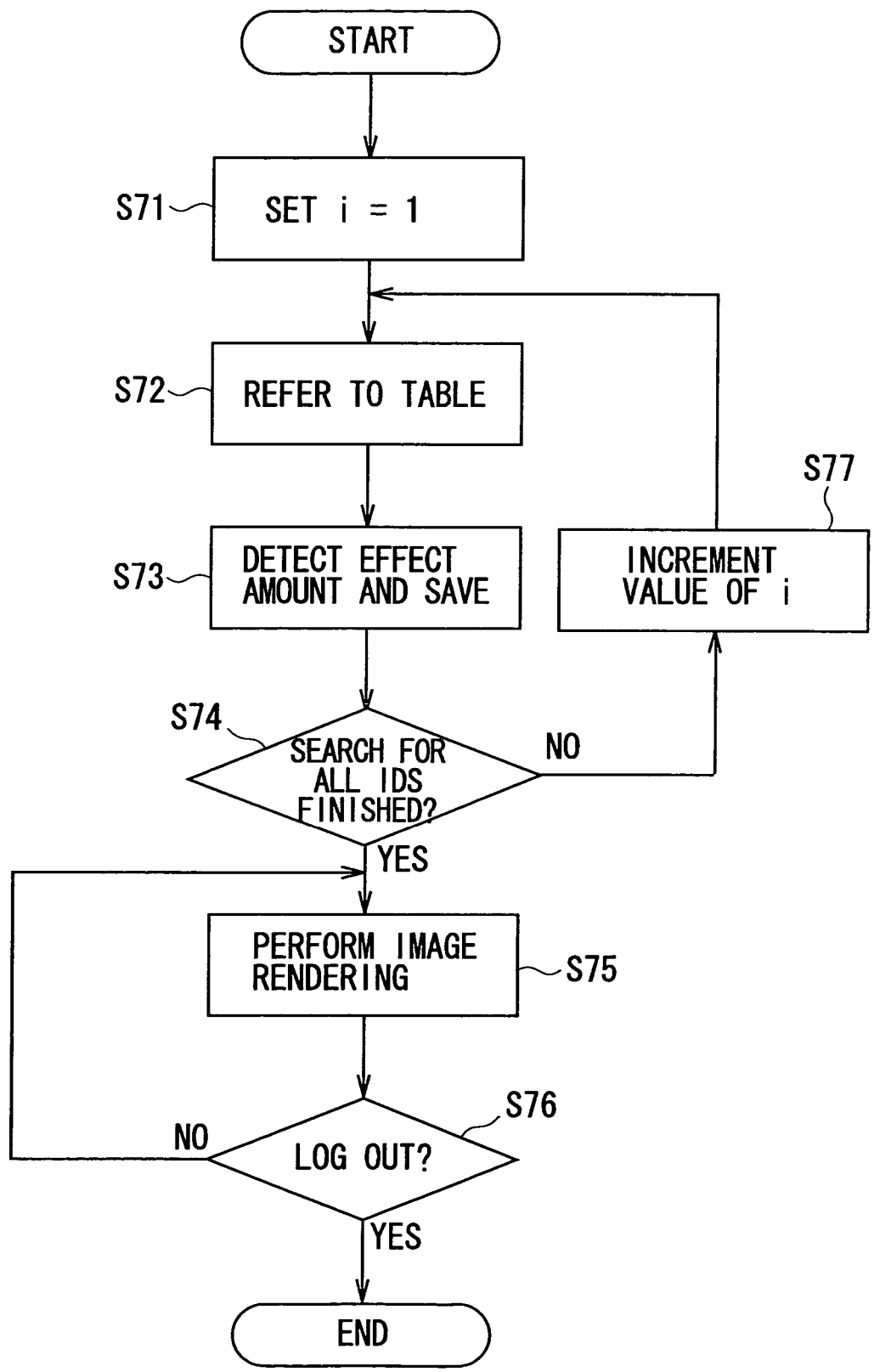
FIG. 19 is a flowchart showing the steps of an image rendering procedure of the network system according to the eighth embodiment.

On the contrary, in the case where logging out of the virtual world is specified, the client terminal apparatus 2 performs disconnection processing of the communication line linked between that client terminal apparatus 2 and the game server apparatus 3 up to that time, and concludes the image rendering procedure shown in FIG. 19.

Image Rendering Process when Adding Motion Blur

Figure 20:
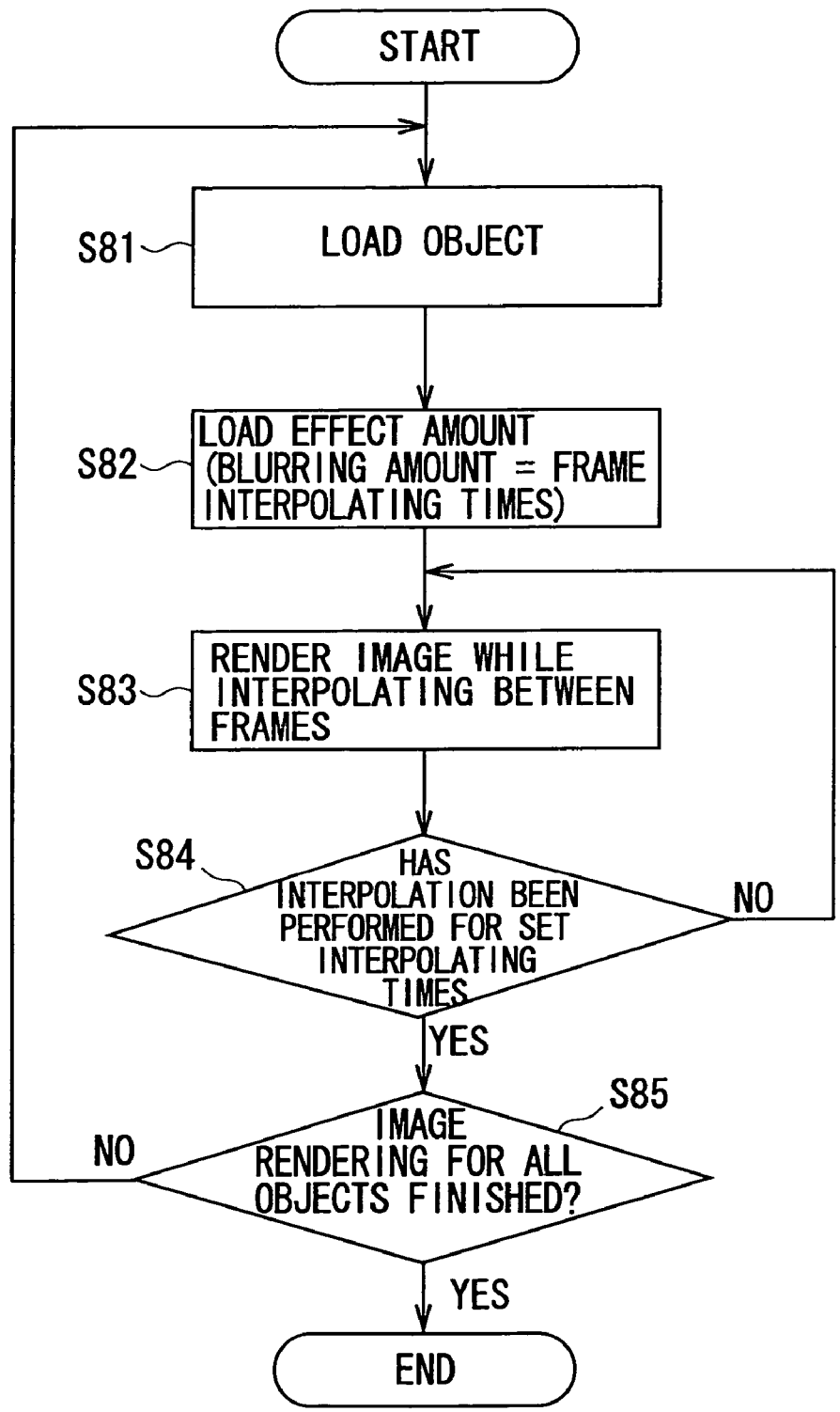
FIG. 20 is a flowchart showing the steps of the image rendering procedure, which adds motion blur, of the network system according to the eighth embodiment.

Next, in the above-mentioned step S75, the image rendering procedure in the case of adding motion blur is described as an example using the flowchart in FIG. 20. Note that since the case of adding effects other than motion blur such as, for example, the above fogging processing or magnification/reduction processing, is also similar to the image rendering procedure described below, image rendering in the case of adding an effect other than this motion blur will also be referred to in the following description.

This flowchart starts when it is determined in step S74 of the flowchart in FIG. 19 that detection of the effect amounts of all objects is completed.

In step S81, the client terminal apparatus 2 loads the object corresponding to the user's view point.

In step S82, the client terminal apparatus 2, from the effect amounts stored in the above-mentioned internal memory, loads the effect amount set to the above-mentioned loaded object. In this case, motion blur is the effect added to each of the objects. As a result, the client terminal apparatus 2, for the loaded objects, sets the number of times to interpolate the inter-frame images in correspondence with the above-mentioned loaded effect amount.

Then, the client terminal apparatus 2, in step S83, by repeatedly performing the image rendering process while interpolating between the above-mentioned frames for this set number of interpolating times, performs image rendering processing by adding motion blur to the respective objects.

Figure 21A:
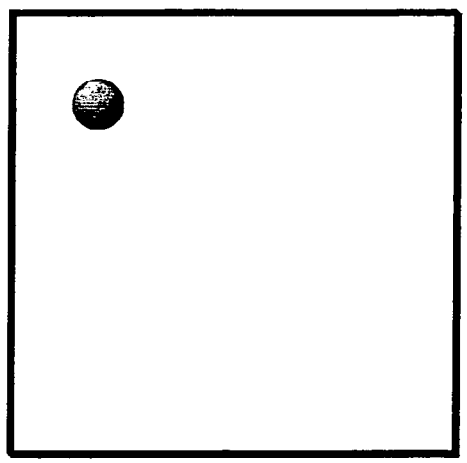
FIG. 21 are diagrams showing a state wherein motion blur is added to an original image.
Figure 21B:
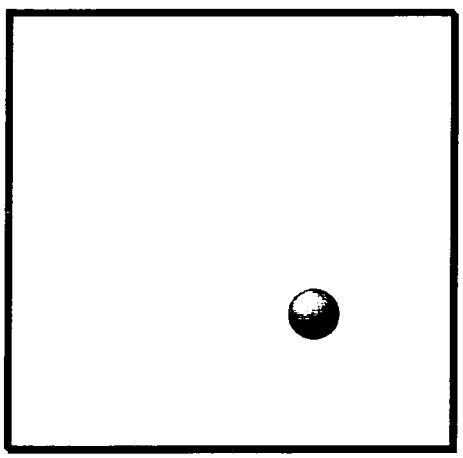

To describe in detail, the spherical image in FIG. 21A is the image of a first frame (or image of a first field); the spherical image in FIG. 21B is the image of a second frame (or image of a second field), which is the frame following the above-mentioned first frame. As shown in these FIG. 21A and FIG. 21B, the spherical image diagonally moves between frames (or between fields) from the upper left to lower right of the drawing. The effect amount to be developed by motion blur is set based on how many images are generated through interpolation processing between each frame (or between each field).

Figure 21C:
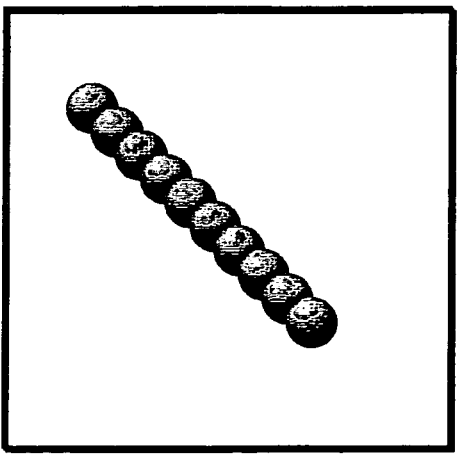

For example, FIG. 21C is an image obtained by dividing into ten parts the duration in between the above first frame image and the above second frame image and by performing interpolation processing. As can be understood from this FIG. 21C, by performing linear interpolation processing (interpolation processing assuming that the moving object moves at a constant speed) or nonlinear interpolation processing (interpolation processing assuming that the moving object moves at an irregular speed) on the moving spherical image, motion blur may be added to the object.

Next, in step S84, the client terminal apparatus 2 determines whether or not the image rendering process for the number of interpolating times, which is set as the above-mentioned effect amount, is completed. Then, in the case where the image rendering process for the entire number of interpolating times is not completed, this image rendering procedure is returned to step S83, and by repeatedly implementing the above-mentioned linear interpolation processing or nonlinear interpolation processing until the image rendering process for the entire number of interpolating times is completed, a motion blurred image is formed.

On the contrary, the client terminal apparatus 2, in the case where the image rendering process for the entire number of interpolating times is completed, which is set as the above-mentioned effect amount, this image rendering procedure proceeds to step S85.

In step S85, it is determined whether or not the image rendering process, which adds such motion blur to all objects, is completed. Then, in the case where image rendering processing for all the objects is not completed, this image rendering procedure is returned to step S81, loading the aforementioned objects and effect amounts, and image rendering processing are repeatedly performed until it is determined that image rendering processing of all the objects is completed.

On the contrary, in the case where it is determined that image rendering processing of all the objects is completed, the client terminal apparatus 2 concludes the image rendering procedure shown in this flowchart of FIG. 20. When the image rendering procedure shown in the flowchart of this FIG. 20, the client terminal apparatus 2 progresses the image rendering procedure to step S76 of the flowchart in this FIG. 19.

Afterimage Processing

Note that the above description is a description of the case of adding blurring to each object by motion blur, however, blurring may be added to each object by afterimage processing in place of this motion blur.

Figure 22A:
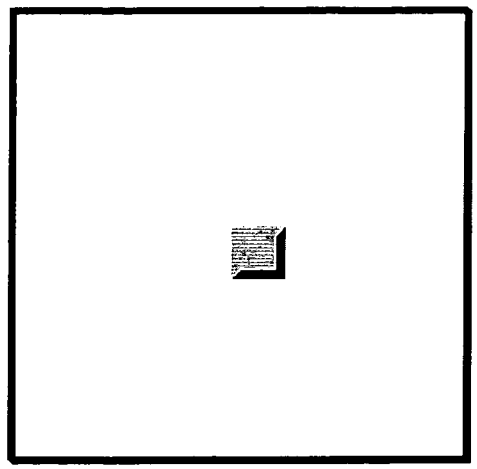
FIG. 22 are diagrams for explaining afterimage.
Figure 22B:
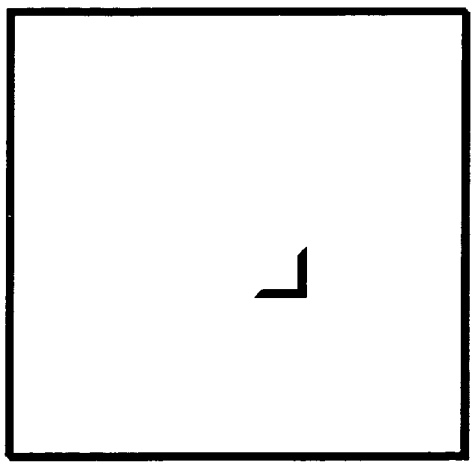

Specifically, the square image in FIG. 22A is the image of a first frame (or image of a first field); the square image in FIG. 22B is the image of a second frame (or image of a second field), which is the frame following the above-mentioned first frame.

Figure 22C:
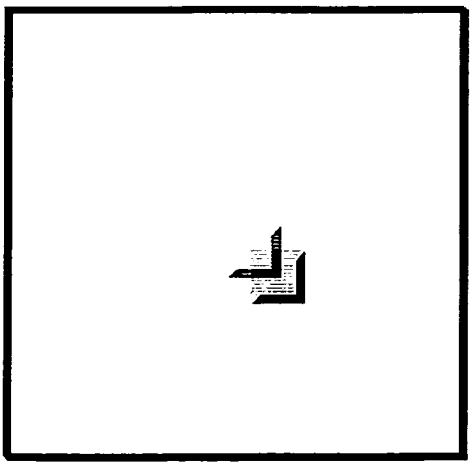

As shown in these FIG. 22A and FIG. 22B, the square image moves between the frames (between the fields) from approximately the center to approximately the lower right of the drawing. Afterimage processing is performed by adjusting the transparency of the image of one previous frame to be, for example, translucent and overwriting onto the image of the present frame as shown in FIG. 22C.

Figure 23A:
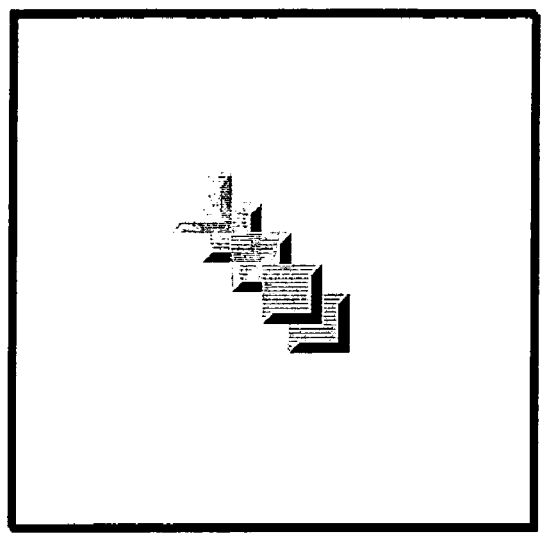
FIG. 23 are diagrams showing examples of the object with afterimage processing applied thereto by overwriting and post-writing.

By performing overwriting for every frame while adjusting such transparency, blurring may be added to the object as shown in FIG. 23A.

Figure 23B:
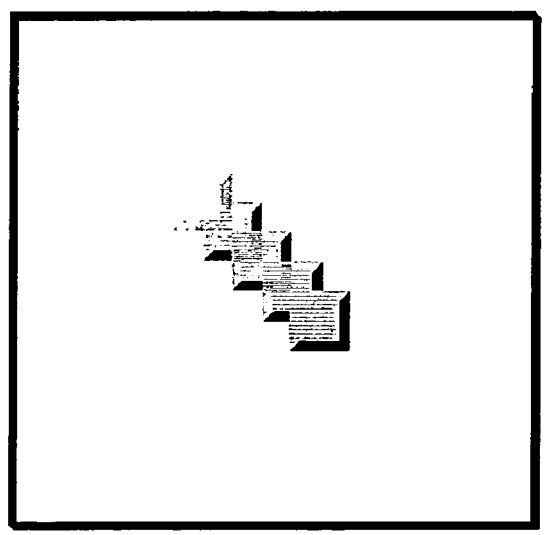

Note that by overwriting the image of the present frame onto the image having such afterimage processing added thereto, blurring is added so that a blurred image may be clearly displayed as shown in FIG. 23B.

In the case of adding blurring to each object by this afterimage processing in place of motion blur, the number of images to perform overwriting as the effect amount thereto is set. Then, the client terminal apparatus 2 overwrites the object for this set number of images so that blurring mat be added to that object.

Effects of the Eighth Embodiment

As is clear from the above description, the Internet game system of this eighth embodiment sets parameters for the effect amount of the effect that is added to each object, thereby allowing image rendering processing for each object to be implemented with an effect amount differing for each and every object.

As a result, in addition to an on/off-type of control, which adds or does not add an effect to the object of attention, control of even the effect amount added to the object of attention may be allowed. Therefore, a further subtle effect adding control may be performed than in the case where the above-mentioned on/off-type of control is performed, and fine adjustment of the degree of highlighting each object is possible.

Finally, the present invention is not meant to be limited in any way by the embodiments described above by way of example; it is also appended herein that even if there are additional embodiments besides those mentioned above, various modifications thereto according to design and such can be naturally made without deviating from the technical spirit and scope of the present invention.

INDUSTRIAL APPLICABILITY

The present invention can be applied to an Internet game system for enjoying video games by manipulating a predetermined object such as a character within a virtual three-dimensional space, which is formed within a network-based game server apparatus on a network such as the Internet.

The invention claimed is:

1. A display apparatus, comprising:
   means for detecting from a moving image a first object as an object of attention adapted to garner the attention of a viewer of said display apparatus, said moving image including a plurality of other objects, said detecting of said object of attention being based on object information representing said first object and said plurality of other objects;
   an image processor operable to perform a first amount of predetermined image magnification/reduction processing to said object of attention and to perform a second amount of said predetermined image magnification/reduction processing to said plurality of other objects, such that when said predetermined image magnification/reduction processing is performed to magnify said moving image, a magnified image of said object of attention is formed more quickly than corresponding magnified images of said plurality of other objects are formed and when said predetermined image magnification/reduction processing is performed to reduce said moving image, a reduced image of said object of attention is formed more slowly than corresponding reduced images of said plurality of other objects are formed;
   an input interface operable to receive: a) user control input given by a user for controlling movement of said moving image; and b) user modification input given by the user for modifying said first amount; and
   a storage unit operable to store information representative of a modified first amount after said first amount is modified in accordance with said received user modification input to produce said modified first amount,
   wherein said image processor is operable to perform said modified first amount of said predetermined image magnification/reduction processing to said object of attention when rendering said moving image whose movement is controlled in accordance with said user control input.

2. The display apparatus according to claim 1, further comprising display control means operable to display said object of attention and said plurality of other objects so that the brightness for displaying said object of attention and the brightness for displaying said plurality of other objects differ.

3. The display apparatus according to claim 1, wherein said object of attention is pre-designated by a producer of said moving image.

4. The display apparatus according to claim 1, wherein said object of attention differs from said plurality of other objects in at least one aspect selected from a) size, said size of said object of attention being larger than a predetermined size and b) display color, said object of attention having a predetermined display color.

5. The display apparatus according to claim 1, wherein said input interface is operable to detect a viewpoint of said moving image and said user control input is adapted to control movement of said viewpoint, said display apparatus further comprising:
  distance detection means for determining a distance between said object of attention and said viewpoint;
  force amount variable means for varying an amount of force of said user control input necessary for said input interface to detect said user control input; and
  control means operable to control said force amount variable means to vary said amount of force in accordance with said distance between said object of attention and said viewpoint.

6. The display apparatus, according to claim 5, further comprising:
  vibration drive means for driving vibrations of said input interface,
  wherein said control means is operable to control said vibrations of said vibration drive means so as to vibrate at an amplitude in accordance with said distance between said object of attention and said viewpoint.

7. The display apparatus according to claim 6, further comprising:
  moving speed detection means for detecting a moving speed of said viewpoint,
  wherein said control means is operable to control at least one of said force amount variable means and said vibration drive means in accordance with a) said moving speed of said viewpoint, or b) said distance between said object of attention and said viewpoint.

8. The display apparatus according to claim 7, further comprising:
  angle of view detection means for detecting an angle of view corresponding to said viewpoint,
  wherein said control means is operable to control at least one of said force amount variable means and said vibration drive means in accordance with said angle of view, said moving speed of said viewpoint, or said distance between said object of attention and said viewpoint.

9. The display apparatus according to claim 8, further comprising:
  sound output means for obtaining a predetermined output of sound; and
  voice feedback control means for controlling said sound output means so as to obtain said predetermined output of sound based on at least one of said angle of view, said moving speed of said viewpoint, or said distance between said object of attention and said viewpoint.

10. A method of processing an image, comprising:
  detecting from a moving image a first object as an object of attention adapted to garner the attention of a viewer of said display apparatus, said moving image including a plurality of other objects, said object of attention being detected based on object information representing said first object and said plurality of other objects;
  performing a first amount of predetermined image magnification/reduction processing to said object of attention and performing a second amount of said predetermined image magnification/reduction processing to said plurality of other objects, such that when said predetermined image magnification/reduction processing is performed to magnify said moving image, a magnified image of said object of attention is formed more quickly than corresponding magnified images of said plurality of other objects are formed and when said predetermined image magnification/reduction processing is performed to reduce said moving image, a reduced image of said object of attention is formed more slowly than corresponding reduced images of said plurality of other objects are formed;
  receiving from an input interface: a) user control input given by a user for controlling movement of said moving image; and b) user modification input given by the user for modifying said first amount;
  modifying said first amount of said predetermined image magnification/reduction processing in accordance with said user modification input to produce a modified first amount; and
  performing said modified first amount of said predetermined image magnification/reduction processing to said object of attention when rendering said moving image for display of said moving image whose movement is controlled in accordance with said user control input.

* * * * *